United States Patent
Lewis et al.

(10) Patent No.: US 7,298,908 B2
(45) Date of Patent: Nov. 20, 2007

(54) METHOD AND APPARATUS FOR DETECTING THE PRESENCE OF ONE OR MORE IMAGES OF A KNOWN PREDETERMINED KIND OF SCENE

(75) Inventors: Meirion F. Lewis, Worcestershire (GB); Brian S. Lowans, Worcestershire (GB); Rebecca A. Wilson, Worcestershire (GB)

(73) Assignee: Qinetiq Limited, London (GB)

( * ) Notice: Subject to any disclaimer, the term of this patent is extended or adjusted under 35 U.S.C. 154(b) by 533 days.

(21) Appl. No.: 10/314,415

(22) Filed: Dec. 9, 2002

(65) Prior Publication Data

US 2004/0037462 A1    Feb. 26, 2004

Related U.S. Application Data

(63) Continuation of application No. 09/569,054, filed on May 10, 2000, now abandoned, which is a continuation of application No. 09/443,365, filed on Nov. 19, 1999, now abandoned, which is a continuation of application No. 09/360,374, filed on Mar. 1, 1999, now abandoned, which is a continuation of application No. 09/164,319, filed on Oct. 1, 1998, now abandoned.

(30) Foreign Application Priority Data

Sep. 24, 1998   (GB)   ................... 9820789.7

(51) Int. Cl.
    *G06K 9/76*    (2006.01)
(52) U.S. Cl. .................................... 382/211
(58) Field of Classification Search ................ 382/211, 382/222, 210
    See application file for complete search history.

(56) References Cited

U.S. PATENT DOCUMENTS 4,471,445 A * 9/1984 Pernick ....................... 702/77

(Continued)

OTHER PUBLICATIONS

Javidi, Bahram, Qing Tang, Guanshen Zhang, and Farokh Parchekani. "Image Classification with a Chirp-Encoded Joint Transform Correlator". Sep. 10, 1994. Applied Optics. vol. 33, No. 26. pp. 6219-6227.*

(Continued)

*Primary Examiner*—Andrew W. Johns
*Assistant Examiner*—Damon Conover
(74) *Attorney, Agent, or Firm*—Nixon & Vanderhye P.C.

(57) ABSTRACT

An apparatus for detecting the presence of one or more images of a known kind in a scene is disclosed which comprises a digital input means and an optical output means. The digital input means comprises a capture means which passes a capture image to a first electronic processing means to produce a scene pattern corresponding to a Fourier Transform of the scene image. This pattern is then digitally combined with one or more reference patterns corresponding to Fourier Transforms of a reference image. The resulting combined patterns are then used to modulate a beam of light which may be focused to perform an inverse Fourier Transform providing correlation information. In a preferred embodiment, the combined pattern is displayed on a spatial light modulator. A "smart" spatial light modulator is also disclosed which comprises an array of light modulating devices, each device comprising a detector and at least one pixel, whereby light incident upon the detector produces an output signal which is adapted to control the state of the modulating medium. By suitable processing, the "smart" SLM may be adapted to either attenuate light below a certain intensity or only light above a certain intensity to act as a saturable absorber.

32 Claims, 18 Drawing Sheets

U.S. PATENT DOCUMENTS

| | | | | |
|---|---|---|---|---|
| 4,669,054 | A | * | 5/1987 | Schlunt et al. ............... 708/816 |
| 4,765,714 | A | * | 8/1988 | Horner et al. ............... 359/561 |
| 4,832,447 | A | * | 5/1989 | Javidi .......................... 359/561 |
| 4,843,587 | A | * | 6/1989 | Schlunt et al. ............... 708/835 |
| 4,972,498 | A | * | 11/1990 | Leib ............................ 382/211 |
| 5,020,111 | A | * | 5/1991 | Weber ......................... 382/211 |
| 5,040,140 | A | * | 8/1991 | Horner ........................ 708/816 |
| 5,598,485 | A | * | 1/1997 | Kobayashi et al. .......... 382/278 |
| 5,600,485 | A | * | 2/1997 | Iwaki et al. ................. 359/561 |
| 5,610,624 | A | * | 3/1997 | Bhuva .......................... 345/84 |
| 5,625,717 | A | * | 4/1997 | Hashimoto et al. ......... 382/260 |
| 5,815,597 | A | * | 9/1998 | Horner et al. ............... 382/211 |
| 5,844,709 | A | * | 12/1998 | Rabinovich et al. ........ 359/248 |
| 5,915,034 | A | * | 6/1999 | Nakajima et al. ........... 382/124 |
| 5,943,170 | A | * | 8/1999 | Inbar et al. .................. 359/561 |
| 5,987,188 | A | * | 11/1999 | Freyre ......................... 382/278 |
| 6,031,643 | A | * | 2/2000 | Burr ............................ 359/28 |

OTHER PUBLICATIONS

Jewell, Jack L., J. P. Harbison, A. Scherer, Y. H. Lee, and L. T. Florez. "Vertical-Cavity Surface-Emitting Lasers: Design, Growth, Fabrication, Characterization". Jun. 1991. IEEE Journal of Quantum Electronics. vol. 27, No. 6. pp. 1332-1346.*

Tang, Qing, and Bahram Javidi. "Multiple-Object Detection with a Chirp-Encoded Joint Transform Correlator". Sep. 10, 1993. Applied Optics. vol. 32, No. 26. pp. 5079-5088.*

Johnson, Kristina, Douglas J. McKnight, and Ian Underwood. "Smart Spatial Light Modulators Using Liquid Crystals on Silicon". Feb. 1993. IEEE Journal of Quantum Electronics. vol. 29, No. 2. pp. 699-714.*

Guest, C.C., M.M Mirsalehi, and T.K. Gaylord. "Exclusive OR Processing (Binary Image Subtraction) Using Thick Fourier Holograms". Oct. 1, 1984. Applied Optics. vol. 23. No. 19. pp. 3444-3454.*

Javidi, Bahram and Chung-Jung Kuo. "Joint Transform Image Correlation Using a Binary Spatial Light Modulator at the Fourier Plane". Feb. 15, 1988. Applied Optics. vol. 27. No. 4. pp. 663-665.*

A. Vander Lugt, "Signal Detection By Complex Spatial Filtering" IEEE Trans. Inf. Theory IT-10, 1964, pp. 139-145.

A.J. Seeds, "Quantum Wells and Lasers: Novel Applications in Opto-Electronic Systems" Fifth Opto-electronics Conference (OEC '94) Technical Digest, 1994, pp. 448-449.

J.L. Horner et al, "Phase-Only Matched Filtering" Applied Optics, 23, 1984, pp. 812-816.

D. Psaltis et al, "Optical Image Correlation With a Binary Light Modulator" Optical Engineering, 23, 1994, pp. 698-704.

W.A. Crossland et al, "The Fast Bit Plane SLM: A New Ferro-Electric Liquid Crystal on Silicon Spatial Light Modulator Designed For High Yield and Low Cost Manufacturability" OSA TOPS 14 (Spatial Light Modulators), 1997, pp. 102-106.

T.D. Wilkinson et al, "Ferroelectric Liquid Crystal on Silicon Spatial Light Modulator Designed for High Yield and Low Cost Fabrication: The Fast Bitplane SLM" Ferroelectrics 213, 1988, pp. 219-223.

S. Vallmitjana et al, "New Multiple Matched Filter: Design and Experimental Realization" Applied Optics 25, 1986, pp. 4473-4475.

M.A.A. Neil et al, "Breaking of Inversion Symmetric in 2-Level, Binary, Fourier Holograms" Proc. Holographic Systems, Devices and Applications, Neuchatel, 1993, pp. 85-90.

G.Y. Yates et al, "Rage-Gated Imaging for Near-Field Target Identification" Proc. SPIE 2869, 1997, pp. 374-385.

J.L. de Bougrenet de la Tocnaye et al, "Composite Versus Multichannel Binary Phase-Only Filtering" Applied Optics 36, 1997, pp. 6646-6653.

B.J. Pernick, "Phase-Only and Binary Phase-Only Spatial Filters for Optical Correlators: A Survey" Optics & Laser Technology, 23, 1991, pp. 273-282.

W.A. Crossland et al, "Ferroelectric Liquid Crystal/Silicon VLSI Backplane Technology For Smart Spatial Light Modulators" IEE Colloquium on "Two Dimensional Optoelectronic Device Arrays" Oct. 1991, pp. 7/1 to 7/4.

* cited by examiner

Binarized phase pattern

Two peak caused by binarized phase pattern

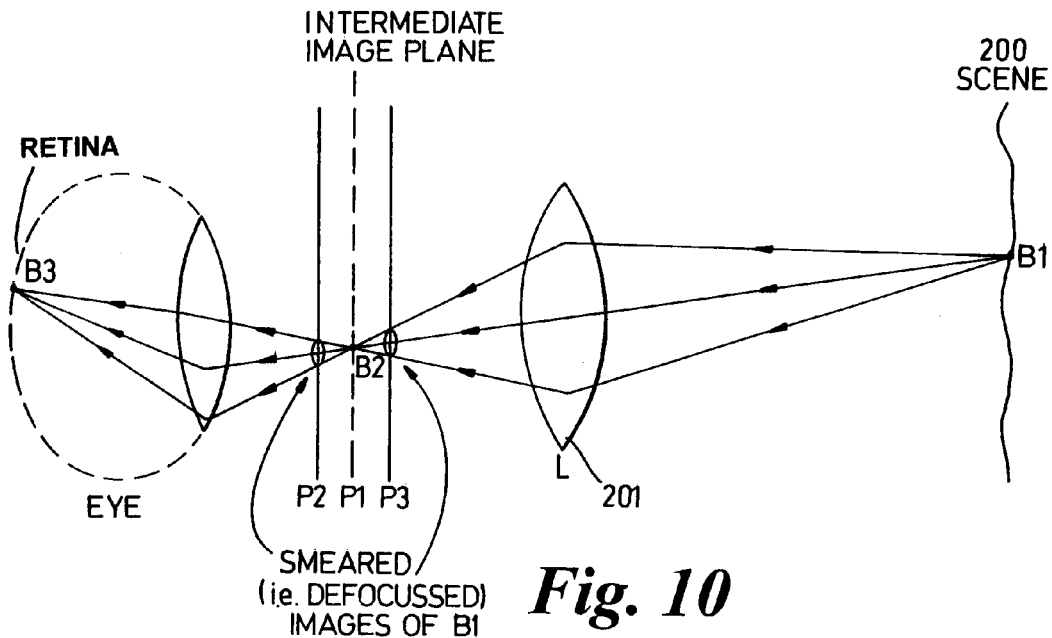
Fig. 10
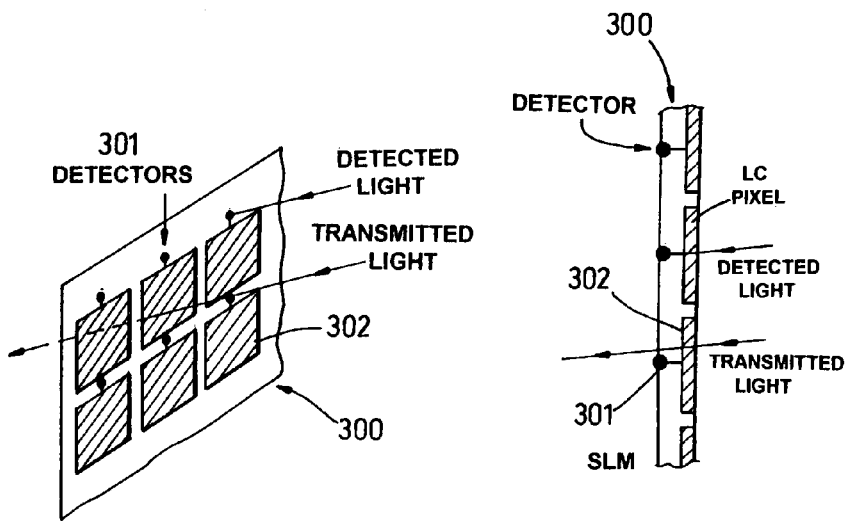
Fig. 11     Fig. 12

$Z_1 < Z_2 < Z_3 < Z_4$

SEPARATE LINES OF DETECTORS IN PARALLEL, POSSIBLY READ OUT IN OPPOSITE DIRECTION FOR ADJACENT LINES.

METHOD AND APPARATUS FOR DETECTING THE PRESENCE OF ONE OR MORE IMAGES OF A KNOWN PREDETERMINED KIND OF SCENE

This application is a Continuation of application Ser. No. 09/569,054, filed May 10, 2000 now abandoned, which is a Continuation of application Ser. No. 09/443,365, filed Nov. 19, 1999 now abandoned, which is a Continuation of application Ser. No. 09/360,374, filed Mar. 1, 1999 now abandoned, which is a Continuation of application Ser. No. 09/164,319, filed Oct. 1, 1998 now abandoned, the entire content of which is hereby incorporated by reference in this application.

This invention relates to improvements in methods and apparatus for pattern recognition, and in particular to an improved method and apparatus for detecting the presence of and/or location of a reference object in a scene. It also relates to other inventions.

Pattern recognition has widely varying applications, for example in industry. An example of a situation where a pattern recognition scheme is required is the detection of the type and location of a car on a busy street. Other examples are industrial production lines, security systems, vehicle identification, finger print and face recognition, etc. Such a process is trivial for a human when provided with a chart identifying car types and a clear vies of the street However, automation of the process by providing a camera to view the scene and computer pattern recognition is a complex process, especially when the illumination is variable and/or the vehicle is partially obscured.

One method for detecting the presence of a predetermined known object within an image of a scene is to look for the correlation between the object and scenery. This can be achieved using the object and image directly, but in many cases it is more efficient to process the data concerned in the Fourier Transform domain, i.e. by processing the spatial frequency components of object and image. Mathematically these processes are related through the "convolution theorem" [reference 1: J W Goodman]. In the abode example, the reference object (we shall always refer to the reference as an object and the scenery as an image) may be that of a car set against a clear background, or a shape of a bottle on a filling line etc. In these examples the scenery might comprise a traffic queue or the filling line, respectively.

In order to be useful in many everyday applications, it is often necessary to have more than one reference object, e.g. different models of car. Furthermore it may be necessary to employ several angular orientations and scales of the reference objects to cover all possible aspects.

In the prior art, it has been proposed to perform the correlation process between object and image using an optical system. This was first proposed by A. Vander Lugt in the 1960's [reference 2]. This system exploits the inherent Fourier Transforming properties of a lens.

A typical optical Vander Lugt-type scheme is shown in FIG. 1 of the accompanying drawings. The system comprises an optical camera 1 which capture an, image of the input scene and drives a spatial light modulator (SLM) 2 to display a mask corresponding to the captured image. In this patent the word "mask" will be used to describe the pattern displayed on an SLM, which pattern may in general include amplitude and/or phase information. A coherent laser beam is passed through a suitable beam expander to produce a wide beam of coherent light which propagates through the SLM 2. The original Vander Lugt work employed fixed holograms rather than SLMs which were unavailable at that time.

The output of the SLM 2 which is located in the front focal plane of lens propagates through lens and forms a Fourier Transform of the mask in the back focal plane of lens where it impinges on a second SLM 4.

In order to correlate the scenery with a reference object the mask formed by SLM 4 comprises the phase conjugate of the Fourier Transform of the reference object. The light propagating through the second SLM, SLM 4, is Fourier Transformed by a second lens 5 in the back focal plane of lens 5 where it is captured by the output camera 6. [Mathematically lens 5 would ideally perform an inverse Fourier Transform but this difference is of no practical importance] If a strong correlation exists between the image and the reference, a sharp bright peak is produced in the pattern in the back focal plane of lens 5. The position of this peak is determined by the position of the reference object in the scene image. A large peak at the origin in the focal plane is also usually observed due to the DC spatial frequency component of the combined Fourier Transform patterns of the scene and reference (i.e. overall intensity) and/or leakage of unmodulated light through the interpixel gaps of the SLM's.

There are several inherent disadvantages to the classical optical Vander Lugt scheme described above. The optical alignment of the two lenses and the SLM's is highly critical, and so the system has a high sensitivity to vibration. Also, the optical path length is quite long, resulting in a bulky and costly system. In addition, the system as described is not as discriminating between similar objects as is often desired in practical systems, for example it would not easily distinguish between "E" and "F".

Since Vander Lugt's original publication many variations on his scheme have been devised and published [Goodman, p237 onwards]. An object of the present invention is to ameliorate some of the problems present in the prior art pattern recognition schemes.

It is believed that a discussion of some terms that are used in this application will be helpful. Appendix 1, which is part of this application and is presented, just before the claims, discusses some terms.

In accordance with a first aspect, the invention provides an apparatus for detecting the presence of one or more objects of a known predetermined kind in a scene, comprising:

a means adapted to produce a captured scene image corresponding to a scene;

a digital input means comprising: first electronic processing means adapted to process at least a part of the captured scene image dataset to produce a scene pattern corresponding to the Fourier Transform of at least part of the scene image, storage means adapted to store one or more reference patterns, each reference pattern comprising the Fourier Transform of a respective reference image, and second processing means adapted to electronically combine the scene pattern with one of the reference patterns to produce a combined pattern, and an optical output means adapted to produce a beam of light that is derived from the combined pattern.

The first and second processing means could be a common processor.

According to another aspect the invention comprises image or pattern recognition apparatus having an electronic combining processor, digital scene input means adapted to input to the combining processor a digital signal representative of a scene pattern, digital reference pattern input means adapted to input to the combining processor digital signals representative of a reference pattern, and optical output means and optical Transform means; the combining means being adapted to combine the input scene and reference patterns digitally to create a combined pattern and being adapted to send a signal to the optical output means which is adapted to generate an optical output dependent upon the combined pattern, the optical output being fed to the optical Transform means which is adapted to Fourier Transform, or inverse Fourier Transform, the combined pattern.

It may be helpful at this stage to refer to FIG. 15 (as well as the list of terms of Appendix 1) which sets our certain nomenclature which will be adopted. "Images" are real things, scene image and reference image (which may be not provided in the system). "Patterns" are the Fourier Transform (or Fourier-like Transform), e.g. scene pattern and reference pattern. The multiplication of the image pattern and a reference pattern is termed the "combined pattern".

The reference pattern may be a synthetic discriminant function.

The optical output means may comprise a spatial light modulator adapted to produce a mask dependent upon the combined pattern and a light source which is adapted to produce a beam of light that is modulated by the spatial light modulator.

The apparatus may also include a second optical to electronic conversion means which is adapted to produce an output signal dependent upon the spatial pattern of the light which has been modulated by the spatial light modulator. This modulated light may be subsequently Fourier Transformed by a lens.

The apparatus according to the first preferred version therefore comprises a digital input means which performs a first stage of Fourier Transform that would be performed optically in a Vander Lugt scheme, and an optical output means which performs the second Fourier Transform.

Preferably the reference patterns are stored digitally either electronically, optically, magnetically or otherwise. They may, for example, be different "shape" patterns and different sizes as well as representing different data.

The captured scene pattern may be combined with a set of reference patterns (or a subset of a set of reference patterns). A "set" may include all of the stored reference patterns which relate to a particular article (or thing) to be recognised.

The scene image may comprise a visual image, or may comprise a two-dimensional array of data obtained from, another input, for example from an X-ray telescope, or signals detected by any sensor or sensor array (for example in the non-visible e.m. spectrum, or even sound or ultrasound). A "scene" may also comprise other more general data (not necessarily representing a picture), and may not be two-dimensional, and may for example be a data string such as that generated by a computer or communications system or from memory in certain cases. In each case, the meaning of the term "image" will vary accordingly.

The apparatus may be adapted to detect the presence of a reference object in a scene in real time. For example, this may mean producing an output within a fraction of a second of capturing a scene image so that an operator does not notice a lag.

It may perform 5000 correlations per second or more. It may perform 10,000 correlations per second, or 20,000, 40,000, 60,000, 80,000, 100,000, or more, and it may perform a number of correlations per second in a range of speeds delineated at the upper and/or lower end by any of the aforesaid figures.

The hybrid combination of the two-dimensional digital and optical processing provides several advantages over the Vander Lugt correlator. The Vander Lugt scheme is, of course, a static scheme whereas it is envisaged that the new system will typically be dynamic—both the scene and the reference data being used will change very rapidly in time. The new system eliminates the optical alignment and stability difficulties present in the classical Vander Lugt scheme because the multiplication of Fourier Transform data is performed electrically rather than optically. This is therefore essentially perfect "alignment" between the input from the scene and the reference input. Secondly, it allows for a great degree of flexibility in the processing of the image and reference patterns, for example the combination may be performed at arbitrary bit accuracy. Thirdly, the number of optical components is considerably reduced. This can reduce the length/size of the device, and improves ruggedness. Furthermore, the image and reference patterns can be generated to match perfectly, in terms of amplitude and/or phase.

We perform the multiplication of two Fourier transfer patterns using gate logic, which is fast enough to give good performance, and then use an optical Fourier Transform (inverse Fourier Transform) which operation cannot be done fast enough digitally to compare hundreds of reference patterns with each input frame (scene pattern) at a rate such that a user perceives it as real time, with no significant lag.

The captured scene image, scene patterns and the reference patterns may be digitised to, say, 8-bit accuracy. More or less accurate digitisation may be used, including binary phase-only data as described later in this patent.

The capture means (input camera) may comprise a charge coupled device (CCD) such as a CCD camera or a CMOS device. This may comprise an array of 100,000 or more pixels, for example 512*512 or more pixels, and produces a captured image (frame) comprising a set of digital data which can be stored (at least temporarily). Means may be provided for selecting the whole or a chosen part of the frame (i.e. less than the whole, and possibly significantly less than the whole, e.g. ½, ¼, 1/10 or less, of the frame) to form a captured scene image. It would typically be preferred to process 128*128, 256*256, 512*512 to facilitate FFT. The camera preferably produces images at a rate of 25-60 Hz, i.e. at industry standard video capture rates. This produces cost savings as devices that operate at these frequencies are widely available and relatively low in price due to economies of scale. However, other frequencies may be used.

The correlation pattern may be captured by a detector array comprising a plurality of discrete lines of detectors, with each line of detectors having means associated therewith for reading out the detected incident light pattern. The detector array may be part of an output camera. This read-out from a single line of detectors is quicker than a conventional camera-based read-out scheme which must perform a scan across a number of rows. The array may be adapted so that each line in the array is read out in alternate directions.

The first and second processing means may comprise one or more digital signal processing boards, and may be combined into a single processing means, such as a digital circuit or computer program. They may comprise, in one arrangement, a transputer and a personal computer which contains the software required to perform the Fourier Transform of the captured scene image.

The spatial light modulator (SLM) may comprise a high speed light modulating array such as the Fast Bit Plane Spatial Light Modulator (FBPSLM) described in our earlier publication [see references 7 and 8]. It may comprise an array of a ferro-electric liquid crystal material which may be provided on a substrate.

The output pattern produced by the modulated beam will contain at least one peak in intensity for each reference object whose (x,y) position(s) in the two-dimensional output pattern is determined by the position of the object in the captured scene image.

The SLM may comprise an array of pixels or elements which can be switched between at least a first state in which light passes through the element whilst being modulated in a first way, and a second state in which light passing through the element is modulated in a second, different way. In each case, the light may be either retarded or amplitude modulated, or both. Preferably, each element comprises a liquid crystal pixel. The SLM may be either transmissive or reflective in operation. There may be substantially a 180° phase difference between light that has interacted with a pixel in the first state compared with light that interacts with a pixel in the second state.

The SLM may be a transmission device, such as a liquid crystal, or a reflective device, such as a micromachined mechanical device (e.g. electronically-controlled movable members which reflect light). For some reflective devices the light does not "pass through" it (but for others it does—e.g. LC plus mirror), and perhaps a more general term would be that the light interacts in a plurality of ways with the device depending upon the condition of regions of the device.

The optical output stage may further comprise an optical lens which may be provided between the SLM and the second optical to electronic conversion means (e.g. output camera) or before the SLM but after the light source.

In a refinement, the lens may be integral with the SLM itself. This could be achieved by digitally processing the combined pattern used to drive the SLM to simulate a zone plate lens overlaid with the combined pattern. Thus there may be no physical glass or transparent medium optical lens separate from the SLM. Alternatively a combination of real and zone plate lenses may be used. In these circumstances the optimum location(s) of the output camera are determined by the focal lengths of the zone plate lens and/or real lens.

A second optical to electronic conversion means may be provided which may comprise a charge coupled device similar to the capture camera where provided. Alternatively, it may comprise a photodetector or array of detectors. This may be located in the focal plane of a real optical lens. It may be adapted to produce an output signal comprising a two-dimensional dataset, or combined pattern, representative of the pattern formed by the modulated light in the back focal plane of the lens. This pattern is dependent upon the correlation between the reference object and input scene image.

An optical spatial filter may be provided close to the SLM, for example, between the SLM and the second optical to digital converter. This may comprise a spatial filter which is adapted to modify the spatial frequency spectrum, for example by reducing the high, low, or any combination of spatial frequencies. A Difference of Gaussian (DOG) filter may be used, which reduces the very high and very low spatial frequency components. Other filters may be employed, e.g. Gaussian filters. The latter may also be introduced through the natural intensity profile of many laser output beams.

A "smart" spatial light modulator may be provided. In a suitable arrangement, this may be after the "combining", for example between the "combining" SLM and the second optical to electronic conversion means, at the camera face or in an intermediate image plane. The smart SLM may comprise a modulator which has an amplitude threshold below which light is attenuated, allowing only the strong correlation peaks to be passed. The smart SLM may comprise a multiple quantum well (MQW) device. Devices having a saturation intensity of 1-3 kW/cm$^2$ are known in the art [see reference 4], which could be used with a 100 mW laser light source and an SLM having a pixel size of the order of 10 microns. The smart SLM is smart in the sense that it reacts to the intensity of light incident upon it. It conveniently has an electronically-controlled transmission or reflection response.

Alternatively, the smart SLM may pass only light below a threshold intensity. Using a smart SLM as a limiter may be useful as an input camera, or possibly on an output camera of a correlator.

The smart SLM may not have only two states of its pixels or regions ("clear" and "dark"), but may instead have a grey-scale number of settings to give a controllable variable response dependent upon the intensity of incident light.

The apparatus may include means for periodically capturing a scene image, means for combining each captured scene pattern with more than one reference pattern in sequence to produce a set of combined patterns, and means for setting the SLM in response to each combined pattern between the capture of each image scene. This requires the scene pattern derived from the scene image to be compared with several reference patterns at a higher rate than the rate of capturing scene images (often a much higher rate, perhaps hundreds or thousands of times higher). This is possible since only one digital Transform is needed for each captured scene image to create a scene pattern, the reference patterns comprising Transforms which have been precalculated and the, typically many, optical Transforms occurring almost instantaneously.

For LC SLMs, after they have been set to display one or more combined patterns, they may be driven with an inverse of the combined pattern or patterns to ensure a substantially constant voltage bias level is applied on average to the modulator to avoid degradation of the liquid crystal material (and that long-term average voltage bias level is preferably substantially zero Volts).

The apparatus may include a personal computer or dedicated signal processing board which is adapted to perform the Fourier Transform steps. A dedicated memory for storing the one or more reference patterns may be provided, which can preferably hold in excess of 100 reference object Transforms (patterns), and in one embodiment we envisage having 400 or 500 reference patterns for a set relating to an article of a known kind.

The new correlation techniques can enable a combining scan to have a large number of pixels/a large size, and hence it is worth having cameras of a large size. An input frame from a camera (or the used portion of it) may have, for example, of the order of 1,000 pixels, or 10,000 pixels or 100,000 pixels. Conveniently, but not essentially, the camera arrays could be 128×128 pixels, or 256×256, or 512×512. The camera array need not be square—e.g. 128×512. There need not be a binary number of pixels in an array direction Having a correlator able to input 10,000, 20,000, 50,000, 100,000, 150,000, 200,000, 250,000, or more pixels (or input pixels in ranges defined at upper or lower ends of any of the points above) for a frame and able to operate at video frame rates (25-60 Hz), and able to Fourier Transform each frame and correlate hundreds of reference patterns with the frame (scene) Transform is possible with the new hybrid correlation technique.

In a refinement, the apparatus may be physically split into at least two portions, the first portion comprising an optical input device which is connected optically to the second portion comprising a base unit which is adapted to perform the Fourier Transforms, and which may include a spatial light modulator.

By splitting the apparatus into two portions connected optically, the first portion can be located in a dangerous or hazardous area whilst the (relatively) expensive computer for the Fourier Transforms and the spatial light modulator can be located in another area. It is possible to have more than one first portion inputting to a common second portion.

The first and second portions are preferably connected via one or more optical fibres or bundle of fibres. The captured image data obtained by the first portion can be transmitted along these optical fibres. An advantage is that optical fibres do not emit and are generally immune from electromagnetic interference.

Preferably, the first portion comprises an optical input device connected to a computer or other electrical device via one or more optical fibres or electrical cables.

Of course, the apparatus could be further divided into discrete sub-portions. By making smaller portions, it is easier to package and transport the apparatus if desired.

In accordance with a second aspect, the invention provides a method of detecting the presence of one or more reference images in a scene comprising the steps of:

producing a captured scene image corresponding to at least part of a scene;

processing at least a part of the captured scene image to produce a scene pattern corresponding to the Fourier Transform of the captured scene image;

electronically combining the scene pattern with at least one reference pattern corresponding to the Fourier Transform of a reference object, and producing a modulated beam corresponding to the combined pattern.

The method may also include the steps of modulating a beam of coherent light by illuminating a spatial light modulator with the beam and allowing this modulated light to propagate to an output plane; and monitoring or displaying the pattern of light formed by the modulated beam.

The method therefore comprises the steps of digitally processing the captured scene image to perform the initial Fourier Transforms that would be performed optically in a Vander Lugt scheme, and optically processing the combined pattern of the scene pattern and reference pattern to form the second Fourier Transform operation. The second Fourier Transform is preferably performed by passing the output of the SLM through a lens to form the optical field in the output plane.

We may perform a Fourier Transform on the captured scene image and process the resulting (Transformed) scene pattern to produce a scene pattern which comprises phase only information. This differs from a full Fourier Transform in which amplitude and phase information is produced. The rejection of the amplitude information in the Fourier Transforms is more-or-less equivalent to performing edge-detection or edge-enhancement on the original reference object and scene images, which is known to improve the discrimination of a correlator [see reference 5]. Of course, both amplitude and phase information may be retained in the Transformed patterns, each to a chosen accuracy. However, the Fourier Transform data is preferably reduced in complexity by generating a binary-related Transform (with either real or imaginary—amplitude or phase), which speeds up the multiplication process necessary to form the combined pattern, making the correlator faster. As an extreme, but still useful, example if the data is reduced to 1-bit phase data (also known as binary-phase data) the multiplication of the scene pattern and reference pattern is reduced to a simple logic operation known as an XOR function. For completeness we mention that the combined pattern requires the multiplication of the Fourier Transform of the reference object (the reference pattern) with the complex conjugate of the Fourier Transform of the image (scene pattern) or vice versa. In the case of phase only data this simplifies the computation to become an addition of the phases of the reference and scene patterns. The use of phase only data also simplifies the SLM requirement, and in the case of binary phase only data the SLM can conveniently be implemented in the form of a ferroelectric liquid crystal device which is fast in operation. We can, of course, store the reference pattern as a binary pattern.

Most preferably, the Fourier Transformed information is processed to produce a scene pattern which comprises only binary information. Thus, in the case of phase only information as hereinbefore, the scene pattern comprises only binary data with say one logic value encoding phases over a range of 0 to 180° relative to (an arbitrary) reference phase, and a second logic value for phases 180-360 degrees.

Where the scene pattern comprises a binary representation of only the phase information contained in a Fourier Transform of the captured scene image, the reference pattern may likewise also comprise a binary phase only Fourier Transform of a reference image. However it is not imperative that the reference and scene patterns are of identical formats.

The method may comprise the steps of combining the scene pattern with the reference pattern using one or more logic elements. An exclusive-or gate (XOR) may be used, and we believe a comparator may be used instead (but an XOR is preferred). Each element of the scene pattern may be combined with its corresponding element in the reference pattern to produce a corresponding element in the second combined pattern. Thus, for a 512 by 512 image. 512*512 XOR operations may be performed in producing a combined pattern. Of course, in an alternative, multi-bit scene patterns may be combined with multi-bit reference patterns and optionally binarised after combining. In all cases the computations are performed digitally and so retain perfect alignment of the two patterns, an advantage over the Vander Lugt scheme in which small mechanical movements can destroy the optical alignment.

The method may further include a preliminary step of processing one or more reference images to produce the one or more (Transformed) reference patterns using FFT techniques.

The Fourier Transform of the captured scene image may be generated using a fast Fourier Transform or FFT algorithm. Because only binarised phase-only information is required, it may conveniently be generated by monitoring the sign of the real component of a full FFT which provides an indication of the phase over a suitable 180° range. Alternatively, the sign of the imaginary part of the Fourier Transformed dataset could be used to determine the phase.

The mask corresponding to the combined pattern may be produced using a binary spatial light modulator, i.e. a modulator comprising an array of pixels which can be switched between two states in response to signals from a multiplier which multiplies the scene pattern and the reference pattern to produce the combined pattern. The pixels may comprise liquid crystal pixels or may be a micromachined device such as an array of micro-mirrors formed using micromachining techniques. Of course, we may use an SLM with more than two stares of its modulating medium.

The spatial light modulator modulates the coherent optical light beam. The SLM may comprise an array of elements which can be switched between at least two states, e.g. with a 180 degree difference in phase. In general the SLM may modulate amplitude and/or phase, and may operate in either transmission or reflection.

The light beam which is modulated by the SLM may be produced using a laser or laser diode. It may be passed through a beam expander before reaching the SLM.

The light that has been modulated by the SLM may propagate to an optical to electronic conversion means such as a camera, possibly via a lens.

The light may not necessarily have to be coherent to laser tolerances. It is believed that it may be important for the light to be spatially coherent, but perhaps not necessarily temporily coherent. The system may be able to operate with a non-laser light source, for example an LED. Whilst it is envisaged that a laser would typically be used because it is cheap, readily available, efficient and coherent, it is not intended to be restricted to this kind of light source if other light sources will work. Indeed, there may be advantages in using temporily incoherent sources, as in the case of incoherent imaging and it will be appreciated that the inventions discussed are not necessarily limited to coherent imaging.

In a refinement, the modulated light beam may be focused by the steps of incorporating a lens into the SLM itself. The method could, it is envisaged, include the steps of preprocessing the combined pattern using digital signal processing to incorporate or overlay the diffraction pattern of a zone plate lens. Thus, the stored data corresponding to a predetermined known reference image may be modified not to be truly data solely of the reference image, but that data as modified by the overlaying of a zone plate lens, the modulated data being stored in the memory corresponding to the reference image or pattern.

In a further optional step, a filter may be provided in the optical system in close proximity to the SLM. It may be before the SLM or after. This modifies the relative importance of the different spatial frequency components. For example, a Gaussian or a Difference-of-Gaussian (DOG) filter may be provided. This filter may be fixed, or programmable, e.g. in the form of an amplitude SLM. The programmability adds to the flexibility of the overall processor, e.g. by making it more or less discriminating at different times against images in the scenery which are similar to, but not identical to, the reference image. It would be possible to run the pattern recognition correlator initially at a reduced discrimination mode, with the programmable spatial filter set to "coarse", and after establishing that at least an approximate match has been found to something in a scene run the correlator again with the correlator set at a "fine" mode to have enhanced discrimination. This could be achieved by controlling the programmable filter as a variable spatial filter. A Gaussian filter could, e.g. for example, be provided before the combining SLM. A DOG filter may be provided after the SLM close to the Fourier plane output camera.

In a refinement, more than one combined pattern may be displayed on a single SLM at one time. For example, four combined patterns may be "tiled" into a respective quadrant of the SLM. This enables four correlation patterns to be produced simultaneously in the output plane. These may relate to the combination of a scene pattern with more than one reference pattern, or the combination of a plurality of reference patterns with a scene pattern, or the combination of a plurality of scene patterns with a plurality of reference patterns.

The pattern in the output plane, which may be the focal plane of the lens or lenses, may be monitored by providing a camera.

In yet a further step, the method may include the step of controlling the intensity of light reaching the output camera (or other detector). This can be achieved by providing a smart spatial light modulator between the SLM and the camera. The light could be thresholded to allow substantially only light above or below a predetermined intensity to reach the camera, or even passing substantially only light between upper and lower thresholds. In another configuration the SLM could operate as a light limiter, or as a thresholder. It may be possible to have an SLM, or a plurality of SLMs, providing both light limiting and light thresholding. It is preferred to hare an SLM acting as a thresholder in a correlator.

A problem with the use of binary phase only information is that two correlation peaks are produced in the pattern at the focal plane of the lens. The two peaks will be symmetric about the origin of the correlation pattern. In addition a large DC peak at the origin is usually produced which can swamp the correlation peaks when the reference image is close to the centre of the captured scene image.

The problem of the dual peaks is believed to be unique to the binary scheme. The presence of the two peaks produces an ambiguity in detecting the position of the recognised objects in the scene image.

The presence of the dual peaks can be exploited to track a recognised object in the scene. When the capture means (i.e. a first optical to electronic converter such as a camera) is not pointing directly at the reference object in the scene, two peaks are produced. When it is perfectly pointed, a single higher peak is produced. Thus by adjusting the orientation of the first optical to electronic converter to maintain the highest peak output, a moving object can be tracked accurately and/or an object can be centred in the input camera/scene input means.

Using this effect, it is possible to arrange that the most desired part of the reference object to be located (e.g. a bolt hole in a component or a vehicle number plate) is always in the centre of the reference image used to form the reference pattern. Then, when the system is used to locate the component and its bolt hole (or to photograph a number plate), two peaks will be produced if a component is in the captured image. When the camera is pointed exactly at the bolt hole, the two peaks overlap at the centre of the correlation pattern. It is therefore possible to aim the camera, and/or any other device (such as an arm carrying a bolt for insertion in a bolt hole) by moving the camera until the two correlation peaks overlap.

According to a further aspect, the invention comprises an apparatus for detecting the presence and/or location of a reference image in a scene comprising a means adapted to capture a scene image and process the scene image to produce a scene pattern representative of a Fourier Transform of the scene image, and a memory adapted to store a plurality of reference patterns to be correlated with the scene image, the reference patterns being Fourier Transforms of references which have their reference objects centred in the reference images.

Most preferably, the most significant part of the reference object is located at the centre of the reference image when generating each reference pattern in the set.

In a preferred system, reference patterns are stored instead of reference images, each reference pattern corresponding to the Fourier Transform of a reference image.

The principle of arranging the most important feature of an object always to be centred in the reference image is of wider applicability than just this pattern recognition apparatus, and can also be used to advantage in systems in which a single correlation peak is generated in the output plane. This is useful because it allows the system to sum all outputs via the smart SLM, and a peak then identifies the location and presence of the reference point in the scene.

In a further refinement, the method may include the further step of applying a chirp encoded pattern to the spectrum of the combined pattern passed to the SLM to produce the mask. The chirp pattern may be adapted to focus parts of the pattern formed by the lens so that the DC component and each of the two correlation peaks are focused into different focal planes. The method may further comprise monitoring the pattern formed in a focal plane corresponding to just one of the correlation peaks. A camera, or other monitor, may be provided at a focal plane where only one, or not all, correlation peaks are in focus. Since the DC component and other correlation peak are out of focus, they are blurred and do not appear to be as distinct. They will also be removed by the smart spatial light modulator, if present.

The chirp pattern can be calculated and added to each reference pattern prior to binarisation. The chirped reference can then be combined with the captured scene pattern after binarising.

There are various other ways of introducing the chirp and binarising the data to be applied to a binary phase SLM. For example the chirp could be combined with the captured image dataset. Alternatively, the chirp encoded pattern could be calculated as a binary pattern and combined with a binarised reference pattern or scene pattern. In this case, both correlation peaks are focused to the same plane, although the DC signal is defocused.

More than one chirp encoded pattern may be used depending on the application.

When the correlation peaks and the DC signature are focused to different planes, it may be possible to introduce a spatial filter to block the DC peak.

The method may comprise the further steps of periodically capturing scene images, combining each corresponding scene pattern sequentially with more than one reference pattern in between the capture of each scene image, and driving the SLM with each resulting combined pattern between the capture of scene images. This enables the scene image to be compared with several references (or a higher plurality of references) at the rate of capturing scene images. This is possible since only one digital Transform is needed for each captured image, the reference patterns being pre-calculated and the optical Transform occurring almost instantaneously. Pre-calculation of the reference patterns removes the need for time-consuming Fourier Transforms to be calculated in real-time.

The output signal may comprise the output from a CCD camera. It may be processed using a threshold detector and thresholding SLM. If a spot having an intensity above a predetermined threshold is detected, the reference image can be assumed to be present in the captured scene, and an output signal passed. If the intensity is below the threshold no signal is passed. This removes background noise. This can be very useful if the inverse Fourier Transform of the combined patterns are integrated before reaching a detector. For example, if the signals passed are thresholded it is perhaps possible to run hundreds of thresholded correlations without worrying about what is happening to any correlation output detector system (which without the thresholding would need re-setting or would give false matches due to build-up of integrated background signals). This can enable the system to process non-matches much faster than if there were no integration. It may be possible to have the input from a plurality of scene capturing devices processed by a common correlator. A smart SLM is a preferred way of performing the above.

In accordance with another aspect, the invention provides a smart spatial light modulator which comprises an array of light modulating devices, each device comprising a light detector, and at least one pixel of a modulating medium, in which the light detector is adapted to measure the intensity of light incident thereupon to produce an output signal, which is adapted to control the state of the modulating medium.

Although a "pixel" is referred to, and although it is primarily intended to have pixels (discrete controllable areas provided in an array), it is also intended that "pixel" be interpreted broadly enough to cover non-pixellated devices (not truly pixellated), such as optically addressed SLMs incorporating a photoconductor or other photosensor.

The smart SLM may or may not include a processor means adapted to process the input signal to produce a control signal which is adapted to control the state of the modulating medium. Each pixel will typically have its own electrical addressing circuitry and possibly its own detector.

The modulating medium may for example comprise a liquid crystal material, photosensitive material, or a movable portion of a micromachined device or other amplitude modulation means.

The light detecting element associated with each pixel or group of pixels may produce an output signal which increases with the intensity of the incident light (or it may decrease).

The processor means may comprise a comparator. One input of the comparator may be connected to a reference signal whilst the other is connected to the output of the light detecting element. This may be adapted to produce the control signal required to switch the liquid crystal to a transmission state when the input signal is above a predetermined threshold or below a predetermined threshold level.

This arrangement may provide a form of SLM which is adapted to transmit only light below a predetermined threshold level. The threshold may itself be controlled externally, e.g. in response to changing light levels in the light beam. This may be done automatically. Alternatively, the SLM may be adapted to only transmit light if it exceeds a predetermined threshold intensity level. This could be useful, for example, in removing low level background light in an image.

In a different application the processor means may be adapted to produce the control signal required to change the state of the liquid crystal (or other modulating medium) to a total or partial extinction state when the input exceeds the threshold value. In this device which limits the intensity transmitted, the light detecting element may be provided behind a pixel or to one side. If to one side, the intensity of light upon the detector is independent of the state of the pixel. If the detector is behind the pixel, the light reaching the detector is first modulated by the operation of the pixel and a feedback loop is formed.

In its simplest form, the smart spatial light modulator may comprise a regular two-dimensional array of identical light modulating devices. Each light modulating device may be directly powered from a single voltage supply such as a battery through a conducting electrode structure. This may be formed on the substrate. It may be metallic or may be formed from an optically transparent material such as Indium Tin Oxide, ITO. In a simpler arrangement the modulator may be driven by the detector output directly. A pixel may be controlled by a signal generated by a photo-detector and applied directly to it, possibly via a resistor. A plurality of pixels, such as a line of pixels or an array of pixels, may be driven by photosensitive signals. A common power source may supply power, typically at a common voltage, to each photosensor controlled input to the pixels Preferably the detector and processing means are confined to a relatively small area in comparison to the associated pixel or pixels. They may be formed integral with the modulation medium on a substrate.

The smart spatial light modulator may be produced using a silicon-on-sapphire substrate or a silicon-on-spinel substrate.

In accordance with a further aspect, the invention provides a method of modulating a light beam comprising the steps of providing at least one detector in the path of the light beam, and providing at least one pixel of a modulating medium in the path of the light beam, and in the event that the output of the detector meets a predetermined condition altering the modulation state of the pixel to attenuate a portion of the light beam.

The detector and pixel may be provided in a single device, which may further include a processor means adapted to process the output of the detector.

In the case of a limiter, preferably the method comprises the further step of providing the detector behind the pixel so that the detector and pixel form a feedback loop. This alters the amount of light passed by the pixel to be controlled to a pixel stable level.

The method may further comprise processing the signal produced by the detector prior to controlling the pixel. This may be performed using any known digital logic or analogue processing technique.

The predetermined condition may be met when the light incident upon the detector is below a predetermined threshold, or when the intensity of light incident upon the detector exceeds a predetermined threshold.

Again, the method may comprise the step of processing the output of the detector using any known digital logic or analogue processing technique.

The method may be refined by providing a CCD camera (or other pixelated detector) behind the one or more pixels. In this case, the pixels may be arranged in an array in front of the CCD camera.

Each pixel of the camera may be aligned with a corresponding pixel of the SLM. This ensures that no light reaches the CCD camera when all the pixels are modulated to block light. For example, this may occur if all the light in the light beam exceeds (or does not exceed) the threshold value.

In accordance with a another aspect, the invention provides a method of optical pattern recognition and/or location comprising the steps of:

combining a scene pattern representative of a scene image with a reference pattern representative of a reference image to produce a chirped combined pattern (where, the reference and/or scene patterns may have been combined with a chirp signal);

displaying the chirped combined pattern on a spatial light modulator;

producing a beam of light which is modulated by the spatial light modulator; and monitoring the modulated light beam to detect the presence and/or location of the reference image in the captured scene image.

The method may comprise the further step of combining a scene pattern which comprises a binary-phase-only Fourier Transform of one image with a binary-phase-only Fourier Transform (pattern) of a reference image. In this case, where two correlation peaks are produced, the chirp can focus these two peaks into separate planes to overcome or ameliorate problems of ambiguity in object location.

The method may further comprise the step of providing an optical lens adjacent the SLM, for example between the SLM and a second optical to electronic conversion means. Alternatively, a zone plate lens can be added. The use of a chirp and/or zone plate lens may possibly make the correlator more compact, for example by removing the need for an optical lens.

The scene image or pattern, reference image or pattern and chirped combined pattern may comprise digital data.

Another advantage which has been demonstrated is that the application of a chirp signal allows slightly non-planar SLMs to be used while still producing a usable correlation pattern. Such non-planar SLMs can arise through imperfections in the manufacturing process, and are much cheaper than optically flat SLMs, since the latter have lower yield.

In accordance with a yet further aspect, the invention provides an optical pattern recognition and/or location apparatus comprising means for combining a scene pattern representative of the Fourier Transform of a scene image with a reference pattern representative of the Fourier Transform of a reference image to produce a combined pattern, means for combining the combined pattern with a chirp signal to produce a chirped combination patterns, a spatial light modulator adpated to display the combined pattern, a light source adapted to emit a beam of light which is modulated by the spatial light modulator, and a monitoring means adapted to monitor the modulator light beam to detect the presence and/or location of the reference images in the scene image.

According to another aspect, the invention comprises a method of controlling the alignment of an alignable member with a desired scene object, the method comprising taking a scene image which contains the object. Transforming the scene image to obtain a binarised Fourier Transform scene pattern, combining the scene pattern with a binarised Fourier Transform reference pattern corresponding to a reference object which matches the scene object to create a binarised combined pattern, inverse Fourier Transforming the binarised combined pattern to produce a correlation output having at least two correlation peaks, and controlling the alignment of the alignable member with the scene object so as to bring the correlation peaks towards each other, preferably making them substantially coincident.

Preferably the movement of the alignable member is controlled automatically by control means.

Areas where the concept of using the alignment of the correlation peaks to align something may have applications include assembly lines (e.g. aligning screws with holes, or components prior to fixing together) and medical applications (e.g. aligning a drill with a bone, or a medical laser with a tumour), or aligning a camera with something, for aligning a face or number plate.

In accordance with a another aspect, the invention provides an optical pattern recognition apparatus incorporating a smart spatial light modulator in accordance with any other aspect of the invention.

The pattern recognition apparatus may be in accordance with the first aspect of the invention, in which case the smart spatial light modulator may be provided in front of the second optical to electronic conversion means. The pattern recognition apparatus may alternatively comprise a standard Vander Lugt optical system or one of its many variants—e.g. FIG. 1.

The smart spatial light modulator may be located as close as possible to the image plane of an optical to electronic conversion means which is adapted to detect the correlation pattern. This may be a CCD camera. Preferably the inter-pixel spacing of the pixels of the smart spatial light modulator may be chosen to match or at least approximately match that of the pixels of the CCD camera (e.g. so that the camera pixels are superimposed relative to the SLM pixels). This enables the system to be made less sensitive to inter-pixel gaps in the smart spatial light modulator, or substantially insensitive thereto. It is also possible to locate an SLM, or a saturable absorber or medium with the same functionality in an intermediate image plane between the "combining" SLM and an output optical to electronic converter (if provided).

The smart spatial light modulator may be adapted to pass only light that exceeds a predetermined threshold value. This enables processing of the pattern detected by the CCD array to be greatly simplified. Since only high level signal components are passed, it can be assumed that each passed signal corresponds to a correlation peak. These peaks can be detected by integrating the camera output over time, for example, over many or all correlation processes performed within one frame time of the first optical to electronic converter (which may be hundreds of correlation processes/combined patterns). Without the smart spatial light modulator, such integration would not produce meaningful results because of the build-up of many low level signals at each pixel. Of course, this would not be necessary if a camera is available with ultrafast read-out.

A drawback of integration is that some information is lost, although this is acceptable in many applications. Information is lost on the precise reference pattern giving rise to the correlation peak. However, this may be acceptable, especially if all reference patterns refer to the same reference object, at different scales and orientations. For example, it may be desired to detect the presence and approximate location of a certain model of car regardless of its distance or precise orientation. It is even more acceptable if a fixed important point on the reference is always centred as discussed earlier, since then we detect the location of that point on the reference.

In alternative applications to the pattern recognition system, the SLM may be adapted to limit the intensity of light reaching the CCD camera. This can help to prevent unwanted blooming caused by a high intensity component saturating the camera, or any other type of detector. A commercial application of such a device would be in "point and click" cameras to stop bright sunlight from over-exposing photographs, or video cameras, or other imaging systems. Another application is in photographing number plates of vehicles at night when they have their headlights on. Other applications are envisaged. Such a camera may be the input camera of a pattern recognition system.

In a further aspect, therefore, the invention comprises a camera which includes a smart spatial light modulator in accordance with any other aspect of the invention.

The smart SLM may be provided as an add-on to the lens of the camera, or integral with a lens unit which includes a lens and a smart SLM, or inside the camera behind the lens.

The reference signal applied to each comparator in the smart SLM may be set in response to measurement of the average light intensity in the overall incident image, such as a pattern in a pattern recognition apparatus. This allows automatic compensation of varying background light levels to be attained.

In accordance with a further aspect, the invention provides an optical assembly comprising:
  at least two light emitting devices and a lens, each light emitting device being spaced at a different position relative to the optical axis of the lens;
  a controller adapted to control the illumination of each device sequentially;
  a spatial light modulator provided between the light emitting devices and the lens; and
  an output detector array adapted to receive light which has been modulated by the SLM.

The optical assembly may be adapted to form a part of a pattern recognition apparatus.

By "between the light emitting devices and the lens" we mean in the optical path of light emitted from the light emitters before it reaches the lens.

The light emitting devices should provide spatial coherence, e.g. may each be adapted to emit a divergent or parallel beam of light.

In a high speed pattern recognition system, processing speed may enable correlation patterns to be generated at high speeds in real time, i.e. up to about 10,000 correlations per second, and possibly higher. This can place strains on the speed of the optical detection circuitry used to analyse the resulting correlation patterns. Good results can be attained using a CCD camera in combination with a thresholding technique. However, CCD cameras cannot reach the high read-out speeds that can be obtained from dedicated single detectors or linear detector arrays especially CCD with large numbers of pixels. The optical apparatus utilises the benefits that can be attained from using a linear detector array in the output camera. Linear detector arrays can be read very fast, possibly limited only by the clock speed. Since it is desired only to output (rather than carry out a computationally-intensive process) combined patterns, the use of a very fast read-out arrangement, such as a linear array, can be beneficial.

The apparatus in accordance with one embodiment operates by stepping the two-dimensional output pattern formed in the focal plane of the lens by the spatial light modulator across the detector array by effectively "moving" the light source.

The detector array may comprise one line of detectors, or two or more parallel lines of detectors. Each line may comprise two or more detectors, perhaps tens, several tens, hundreds, several hundred, or even of the order of a thousand, or more, detectors.

In a most preferred arrangement, an array of more than two light emitting devices is provided. This may comprise a linear array of two or more light emitting devices arranged substantially orthogonal to the optical axis which passes through the centre of the spatial light modulator and lens. The array of light emitting devices may be aligned orthogonal to the array of detectors. There may be several, tens, several tens, hundreds, several hundreds, or even of the order of a thousand, or more light emitting devices.

A collimating lens may be provided between the light emitting devices and the SLM. A single collimating lens may be provided for all the devices.

A polariser may also be provided between the light emitting devices and the SLM. The polariser may form part of the SLM.

The Fourier Transform lens may be provided preferably, but not necessarily, between the SLING and the detector array. Alternatively, it may form part of the SLM. It may comprise a virtual lens generated by incorporating a zone plate lens function into the mask pattern produced by the SLM.

The light emitting devices may comprise lasers or laser diodes adapted to produce a source of coherent light. Preferably, only one light emitting device is arranged or controlled to emit a light beam at any instant.

The array of devices may comprise a VCSEL array.

For a 512 by 512 pixel mask displayed on the SLM the output field of interest also comprises 512*512 points at full resolution, and a VCSEL array having 512 elements and a 512 element detector may be provided. In this way, no loss of information need occur if the control means turns each of the elements of the VCSEL on in turn to scan the 2-D pattern in 512 steps However, it is not always necessary to read the output at full resolution and a fewer detector pixels may be provided than there are SLM pixels. In the limit a smart SLM or saturable absorber may be followed by a single large area detector.

A number of detector arrays arranged in parallel may be used. In this case, the number of VCSEL arrays required for optimum results is reduced to R/N where R is the number of rows (or columns) in the SLM and N is the number of detector arrays. Of course, it will be appreciated that in the most extreme case, only one emitter array and R detector arrays can be used.

In accordance with a further aspect, the invention provides a method of monitoring a two-dimensional optical pattern for example that produced when a light beam passes through a spatial light modulator, by providing at least two light emitting devices and a lens for example between the devices and the spatial light modulator (if an SLM is provided), the at least two devices being at different positions relative to the optical axis of the lens, comprising the steps of controlling the devices so that each device is illuminated sequentially to effectively move the source of the light beam and providing at least one detector means in a plane which contains the optical pattern which is to be monitored, whereby controlling the devices scans the two-dimensional pattern across the detector means.

By illuminating each light source in turn, the two-dimensional pattern can be moved across the detector. In practice in the correlator application the outputs from the detector array(s) will typically be thresholded as they emerge to detect any correlation peaks present. It is also possible to integrate the thresholded correlation signal over time.

The method may comprise providing three or four or more light emitting devices, and more than one detector.

The light sources may be positioned in a line orthogonal to the optical axis of the lens and the SLM. The detector means may also comprise a line of detectors. This may be arranged orthogonal to the orientation of the optical axis of the lens and to the line of light emitting devices.

The method may further comprise providing a collimating lens between the one or more light emitting devices and the SLM.

The light emitting devices preferably comprise laser diodes.

The optical assembly may be incorporated into a pattern recognition apparatus in accordance with the first aspect of the invention. It can also be used to implement a part of the method of the second aspect of the invention. In either case, the SLM may be driven to display a pattern corresponding to at least a combination of the Fourier Transform of an image and of a reference. The optical lens after the SLM then acts as an optical Fourier Tranformer, and a two-dimensional correlation pattern can be scanned across the detector array.

In accordance with a further aspect, the invention provides apparatus for detecting the presence and/or location of a reference object in a scene comprising means for illuminating the scene adapted to emit at least one pulse of electromagnetic radiation, means adapted to produce a captured scene image corresponding to the reflected radiation received at a predtermined time after the pulse of radiation is transmitted, processing means adapted to process at least a part of the captured scene image to produce a scene pattern corresponding to the Fourier Tranform of the captured scene image, and means adapted to electronically combine the scene pattern with at least one reference pattern corresponding to the Fourier Transform of a reference object to produce a combined pattern. It will also be appreciated that the several inventions discussed herein can find many applications outside of the field of pattern recognition, and are not restricted to that field.

In accordance with a further aspect, the invention provides a method of detecting the presence of and/or location of a reference object in a scene comprising the steps of:
  illuminating the scene by transmitting at least one pulse of electromagnetic radiation;
  producing a captured scene image corresponding to the reflected radiation received at a predetermined time after the pulse of radiation is transmitted;
  processing at least a part of the captured scene image to produce a scene pattern corresponding to the Fourier Transform of the captured scene image; and
  electronically combining the scene pattern with at least one reference pattern corresponding to the Fourier Transform of a reference image to produce a combined pattern.

The radiation may comprise ultraviolet, visible or infrared light, or other wavelengths.

In a preferred arrangement, the method comprises the further steps of:
  producing a mask corresponding to the combined pattern using a spatial light modulator;
  modulating a beam of coherent light by the spatial light modulator; and
  monitoring the pattern of light formed after modulation by the spatial light modulator.

By transmitting a pulse of radiation such as light, it is possible to capture the scene image at a predetermined delayed time where the delay ensures the captured scene image corresponds to light having travelled a predetermined distance. When fog or smoke is present between the apparatus and the scene, which could swamp out the image of the scene, this light will be reflected back before the image is captured. Similarly background objects such as walls or trees might be rejected because the light reflected from them arrives too late. The reflections from an object between predetermined distances away from the detector can therefore be isolated. This can make pattern recognition much easier since the amount of irrelevant data can be reduced. This can be very useful in, for example, photographing vehicle number plates as vehicles drive past in the fog, perhaps as part of a speed-detector system for identifying speeding vehicles.

The radiation pulse may be produced using a laser.

Preferably, the method may comprise the steps of capturing scene images corresponding to several different time delays. This allows a pattern recognition technique to be performed in three dimensions by looking at the scene a slice at a time (sliced in the depth of view direction). This aids the pattern recognition process, and exploits the great speed of the processor described here. The method may therefore comprise capturing at least two scene images corresponding to light reflected from portions of an object in a scene which are of different distances. From these two images, an object can be identified by performing spatial analysis using reference patterns corresponding to "slices" through a reference object (i.e. two objects which look similar in two dimensions may be distinguished with three-dimensional information).

The pulse duration may be of the order of 1 ns, or up to 10 ns or more. The received light may be passed through an optical intensifier. This may be pulsed with a duration of, typically, 50 psecs to 10 ns depending on the application.

Of course, it will be readily appreciated that this aspect of the invention can be combined with any of the features of the other aspects of the invention, and in essence is a refinement to the general techniques of pattern recognition. Indeed, any of the various features and inventions disclosed herein can be used in any combination with another of the inventions or features disclosed herein.

The illuminating pulse may derive from the same point, or substantially the same point, from which the image is captured. Alternatively, it may derive from a different location.

The technique may be used as a refinement to image identification after the initial presence of a an object of a recognised class has been identified using a pattern recognition scheme. The method may be combined with any of the apparatus or methods of the preceding aspects of the invention. In a preferred method, the location of an article is first detected using spatial correlation Two scene images are then captured (or more) corresponding to different parts of the object at different distances to aid recognition.

The pulsed time/range-gated detection system is particularly useful in combination with the faster correlator techniques discussed earlier since this may be the first correlator which is fast enough to take advantage of a three-dimensional slice picture of the scene.

In accordance with another aspect, the invention provides apparatus for detecting the presence and/or location of a reference object in a scene comprising means adapted to produce at least two combined pattern masks, said means adapted to combine at least one scene pattern and at least one reference pattern to produce a first combined pattern mask, means adapted to combine at least one scene pattern and at least one reference pattern to produce a second combined pattern mask, and display means adapted to display said at least two combined pattern masks simultaneously on a spatial light modulator.

The combined pattern masks are preferably not superimposed upon each other on the display means.

In accordance with a further aspect of the invention, a method of detecting the presence and/or location of a reference object in a scene comprises the steps of:
producing at least two intermediate masks (combined patterns) by combining at least one scene image with at least one reference image; and
displaying said at least two masks simultaneously on a spatial light modulator.

The two intermediate masks (combined pattern) may both be simultaneously illuminated by a light beam. Lenses may be provided to focus that part of the light beam which is modulated by the SLM into a focal plane.

In this manner, two correlation patterns can be produced simultaneously.

Of course, three, four or more intermediate masks may be displayed simultaneously on the SLM at any one time. Each intermediate mask may produce a respective correlation pattern.

The intermediate masks may be "tiled" onto the SLM. Intermediate masks may be tiled to be adjacent each other. One example is that four intermediate masks may be displayed with one mask occupying a respective quadrant of the SLM.

The intermediate masks may be produced by electronically combining a Fourier Transform dataset (scene pattern) dependent upon a detected image with a Fourier Transform dataset of a reference object (reference pattern). Both may comprise binary-phase-only data.

In accordance with a still further aspect, the invention provides a method of reducing the time required to maintain a net zero voltage across each pixel of an SLM (which may comprise liquid crystal materials) to prevent dissociation of the liquid crystal molecules, changes in the voltage altering the modulation state of the pixel, comprising the steps of:
adding or otherwise establishing the voltages applied to a respective pixel of the spatial light modulator corresponding to at least one displayed mask input to the modulator, and
applying the required voltage to each pixel for a length of time which is opposite in sign to the sum of the voltages.

This may require more than one mask.

There are many schemes in the prior art used to maintain a net zero voltage, for example, after each mask is displayed, a "negative" mask is displayed. However, this results in 50% of the available display time being repeated to display the negative mask; this is usually undesirable.

In our method, successive masks re applied using oppositely-signed voltages. Preferably a mask is displayed with a positive voltage followed by a different mask with a negative voltage then a third mask with a positive voltage etc. This has the effect that each pixel has a different average voltage over time which rends towards zero for sequential values which are random in time.

Preferably, the sum of the voltages applied to each pixel is stored. This data can then be consulted to produce the required corrective positive and negative voltages for each pixel on the SLM to achieve a net zero voltage over time.

The patterns to be applied to the modulator over a predetermined time period may be pre-calculated. The voltages for each pixel which must be applied to reduce the effects of dissociation can then be calculated individually from the pre-calculated patterns (instead of actually measuring voltages). Thus, from a sequence of patterns to be applied, the optimum combination of positive voltage patterns and negative voltage patterns which must be applied to get approximately zero net voltage can be calculated. If necessary a single "compensating" image can be displayed after, say, two or more patterns to maintain the zero average voltage. In fact, we envisage only displaying a "compensating" image after tens, and more preferably hundreds, of patterns have been displayed.

Thus, instead of "compensating" the pixels of the SLM on a pattern by pattern basis, we compensate only after a batch of patterns has been displayed. The display of wanted patterns on the SLUG may therefore be practically twice as fast as the prior art method.

In accordance with a yet further aspect, the invention provides an optical system incorporating a spatial light modulator (SLM) which is adapted to reduce the time required to maintain a net zero voltage across each pixel of the SLM which further comprises generating means adapted to generate a number of patterns to be displayed on the SLM (a list of patterns), means adapted to establish the net integrated voltage bias effect on each pixel of the SLM created by displaying the list of patterns, and means adapted to apply to each pixel an opposite list correction voltage of substantially the same magnitude or the integrated voltage applied to that level by displaying the set of patterns so that the net integral voltage applied to each pixel after the integrated voltage is substantially zero.

It will be appreciated that the combining unit/multiplying unit used to combine a scene pattern and a reference pattern will typically be the electrical/digital combiner as used in the arrangement of claim 1, but for other aspects of the invention, or for various preferably features, the combiner need not be a digital device but could be any suitable combiner.

There will now be described, by way of example only, several embodiments of the present invention with reference to the accompanying drawings, in which.

Figure 2:
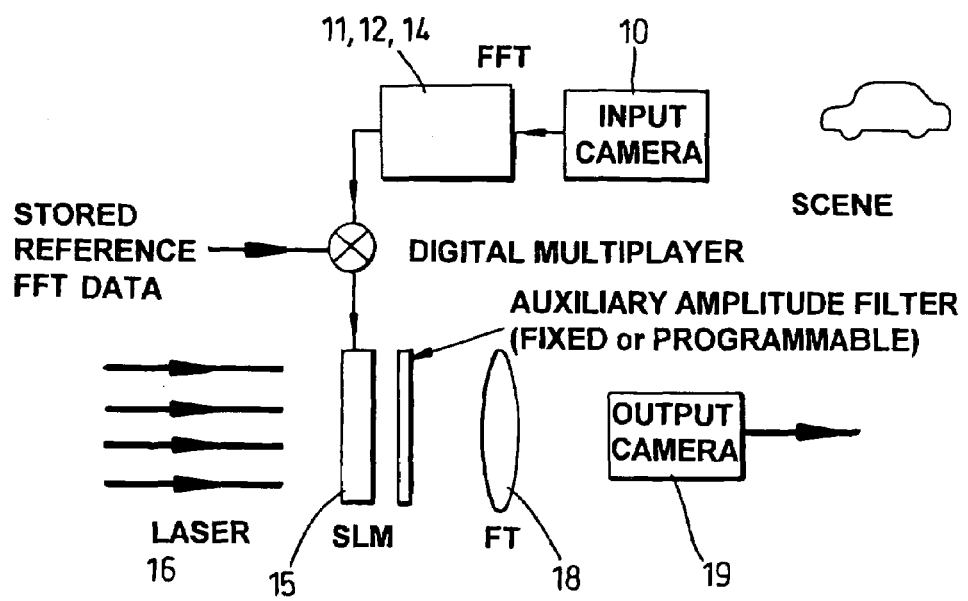
FIG. 2 is a general schematic of a pattern recognition apparatus in accordance with one aspect of the present invention.
Figure 3:
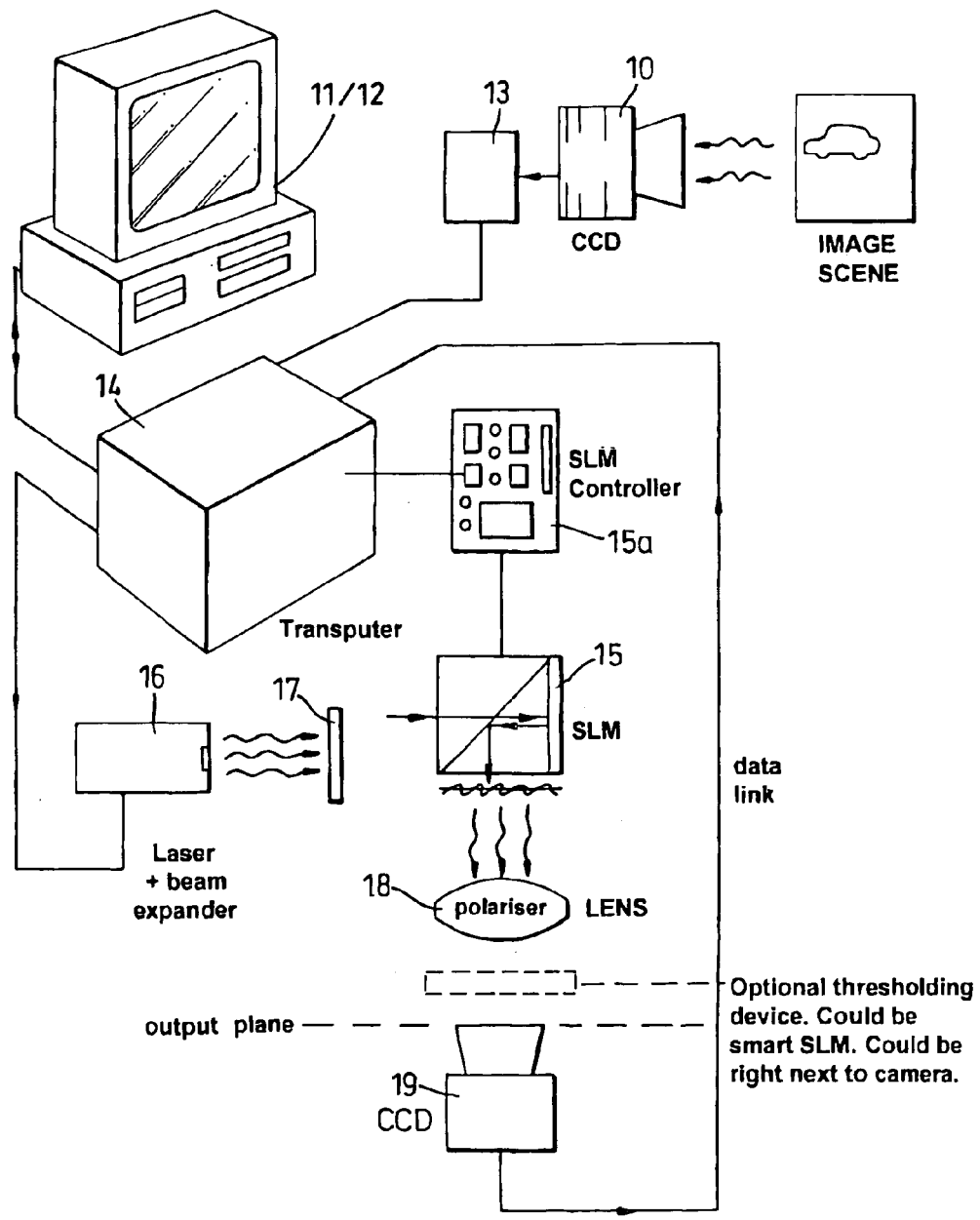
FIG. 3 is a different illustration, showing the main component parts of the apparatus of FIG. 2.
Figure 4:
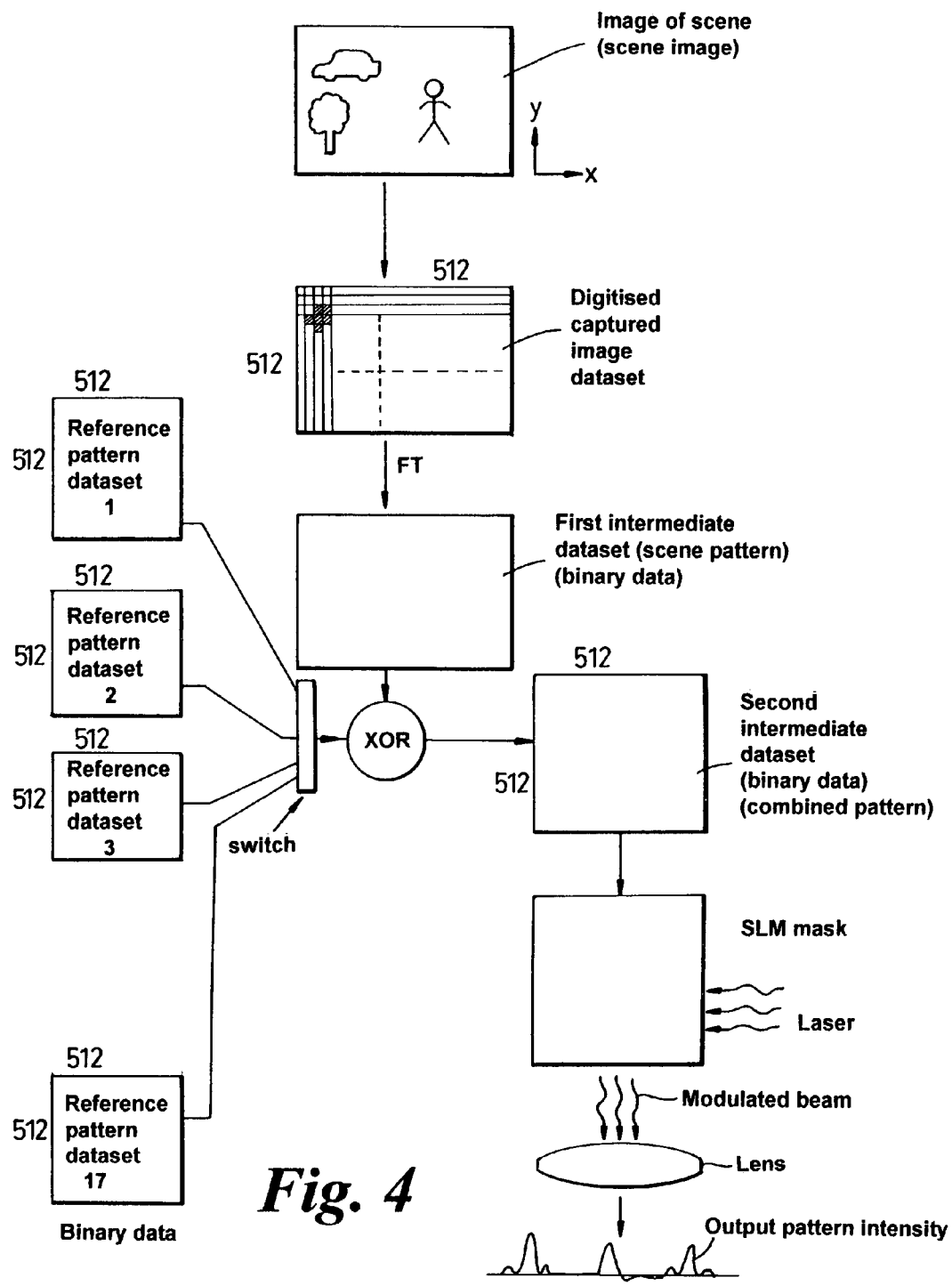
FIG. 4 illustrates the various images and patterns formed during processing of an image by the apparatus shown in FIGS. 2 and 3.
Figure 5:
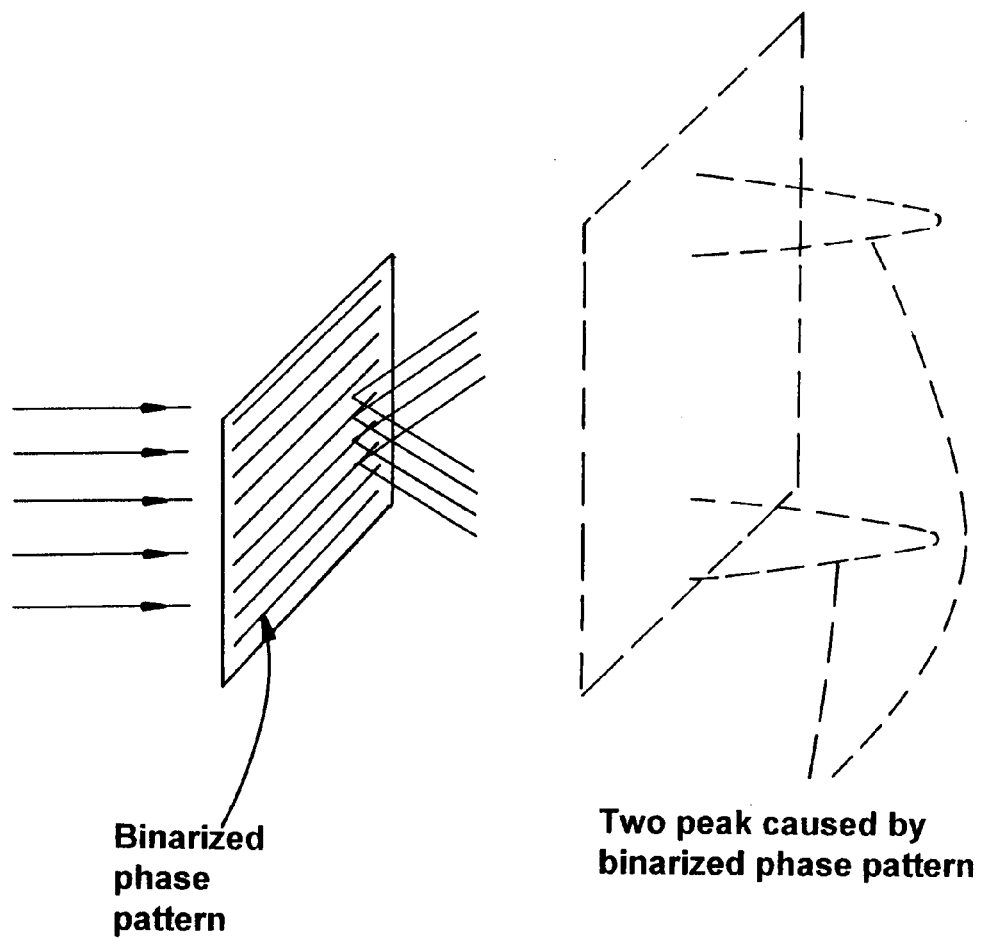
Figure 6:
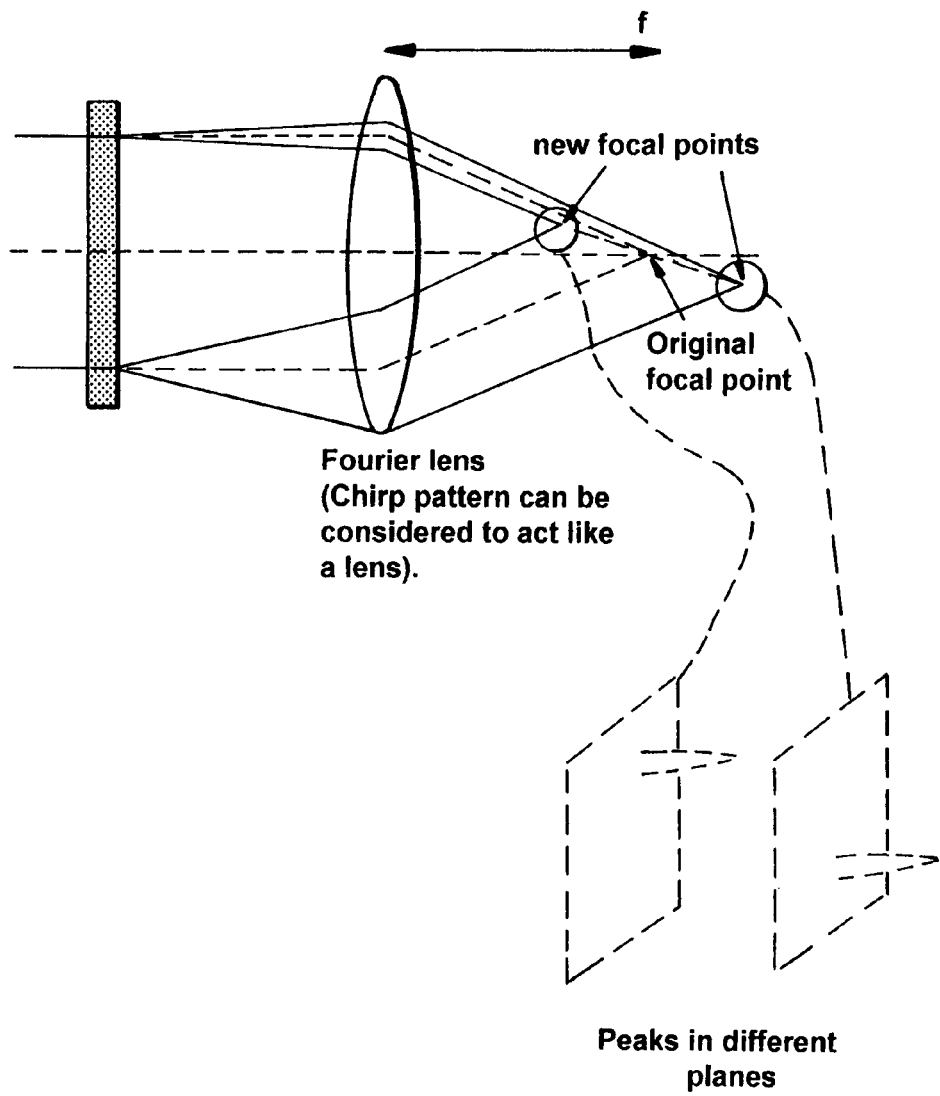
Figure 7:
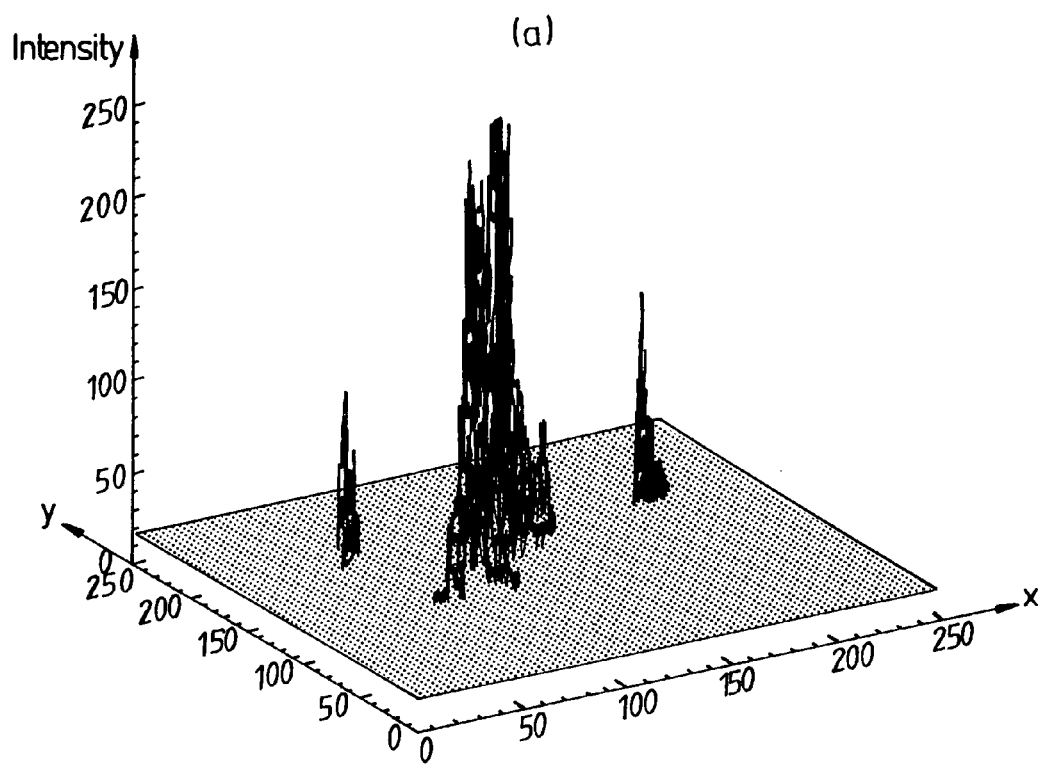
Figure 8:
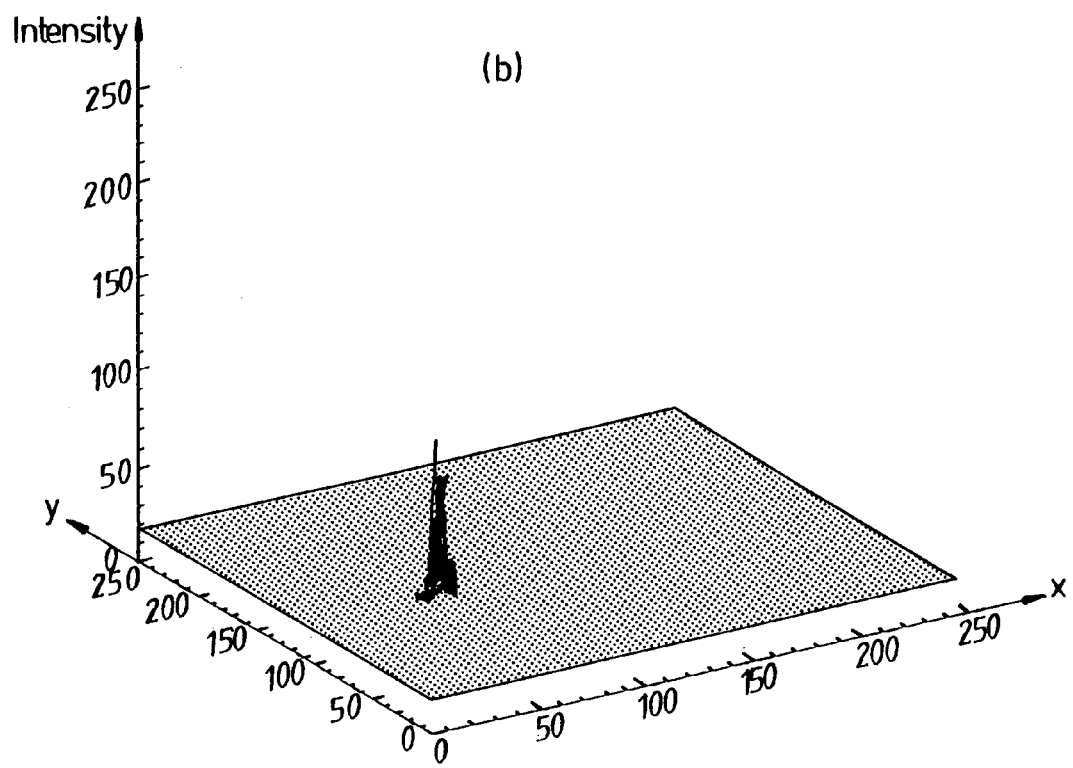
Figure 14:
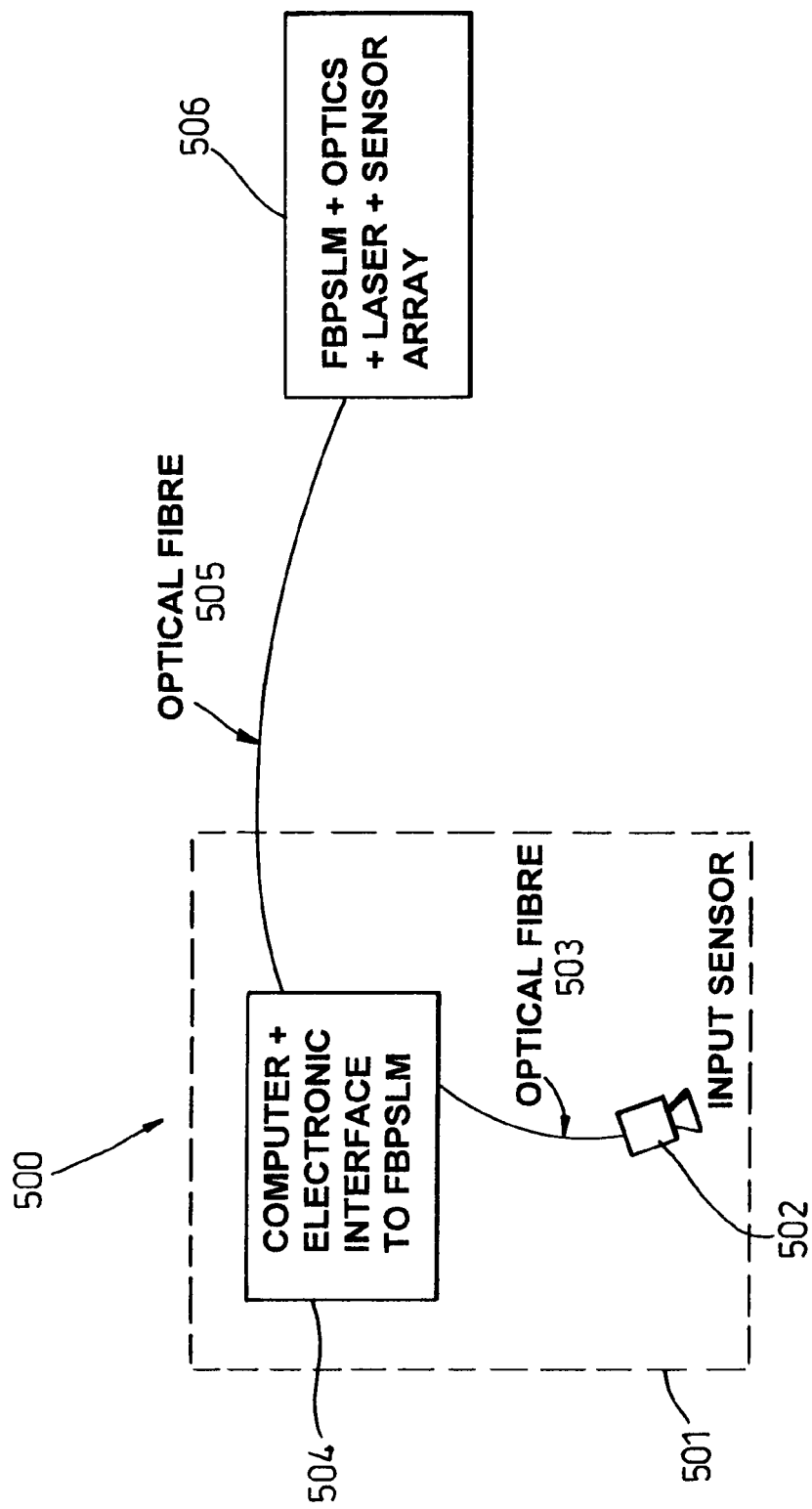
Figure 15:
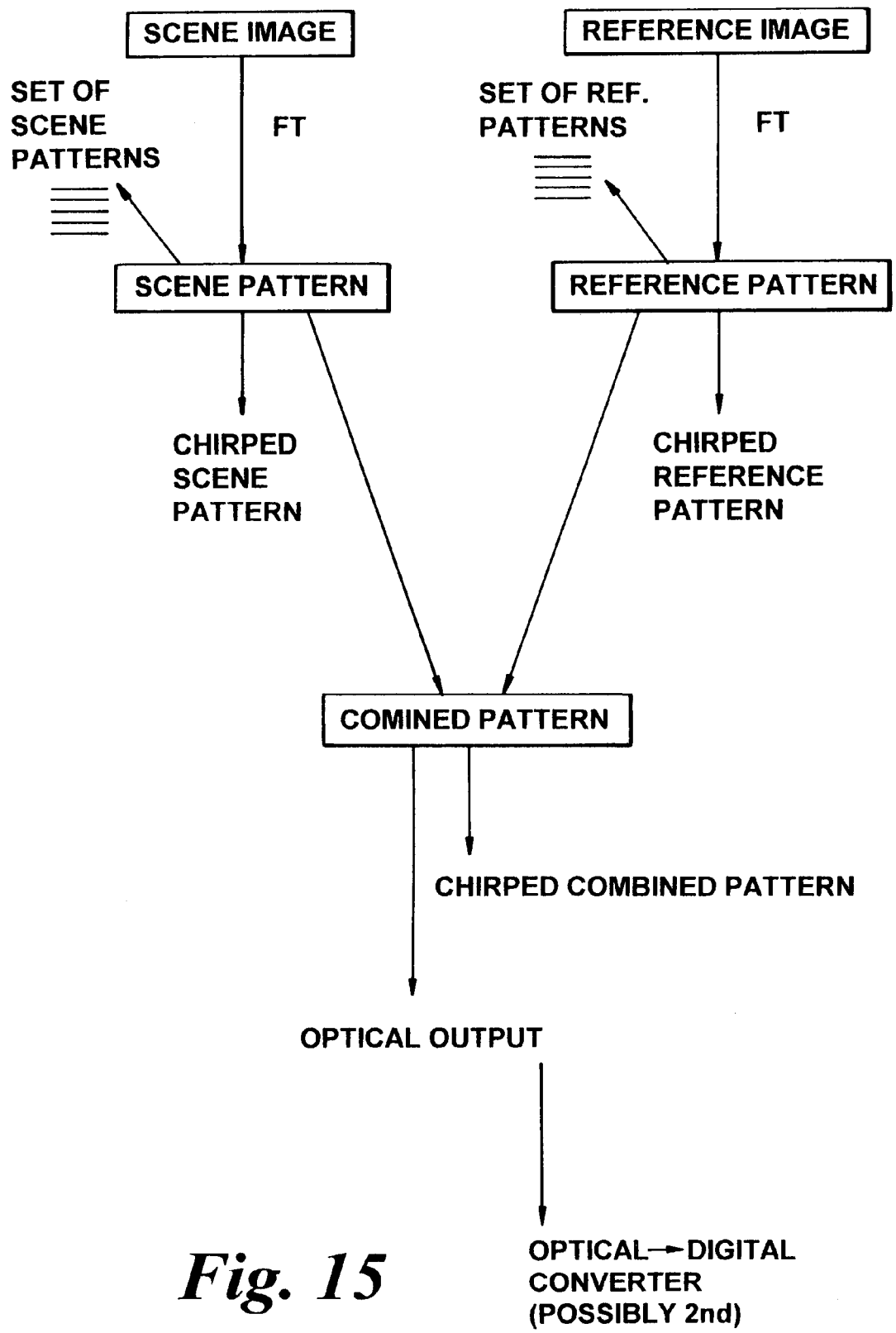
Figure 16:
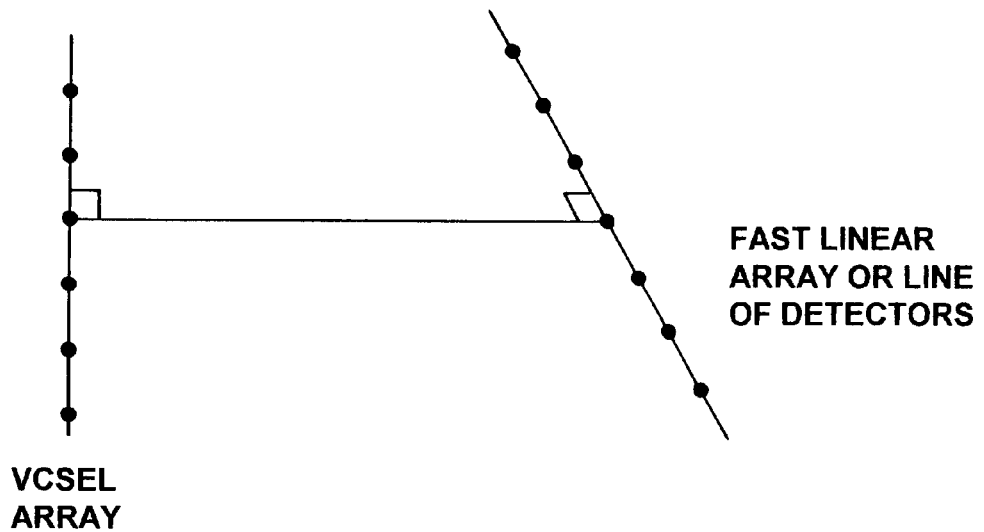
Figure 17:
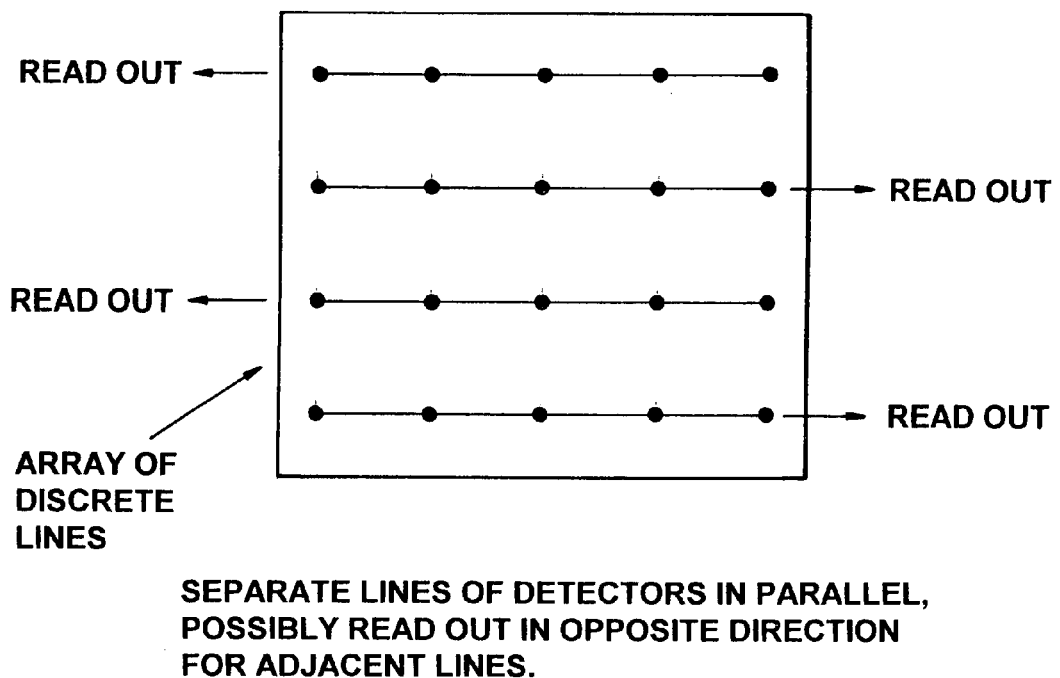
Figure 18:
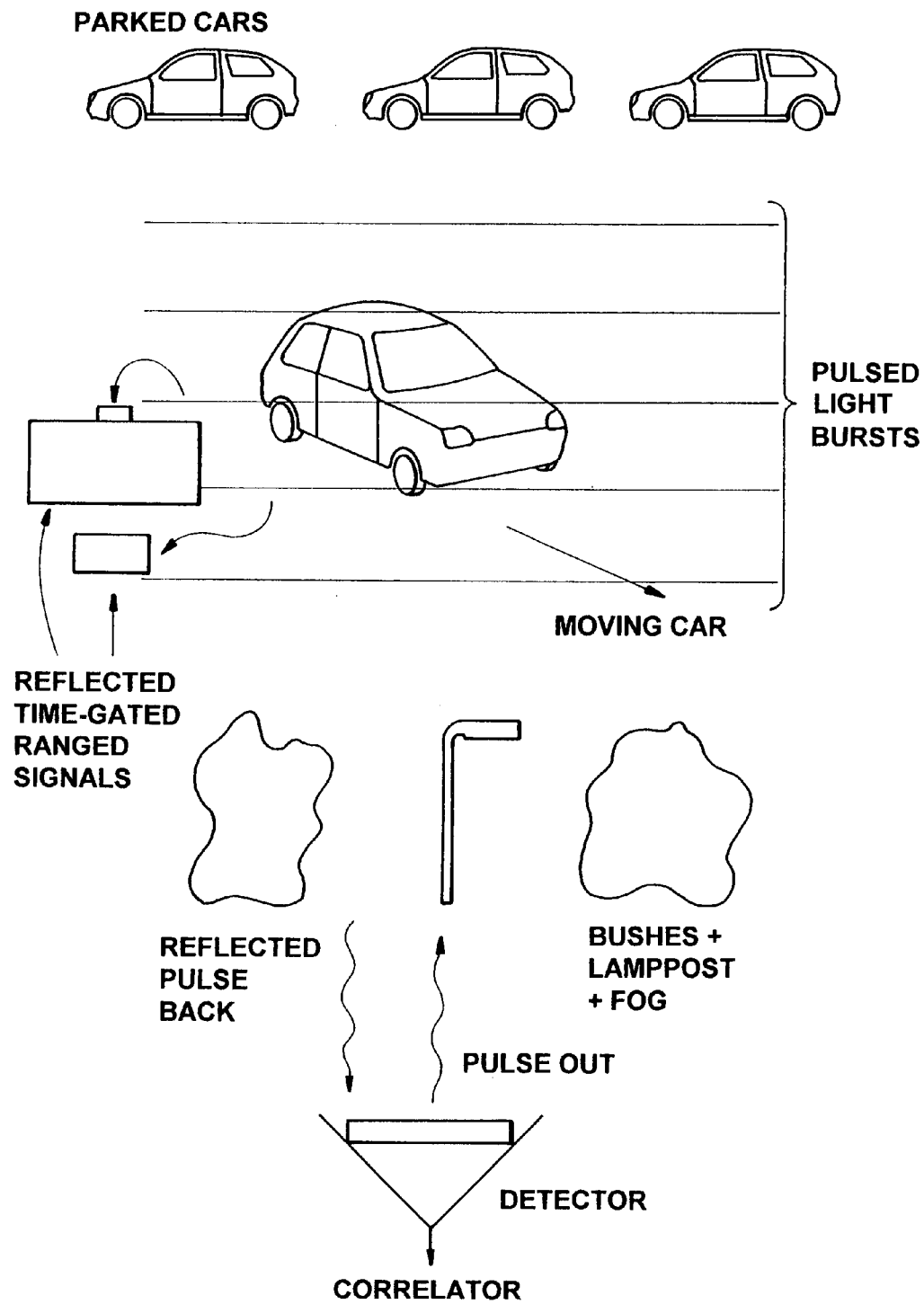
Figure 19:
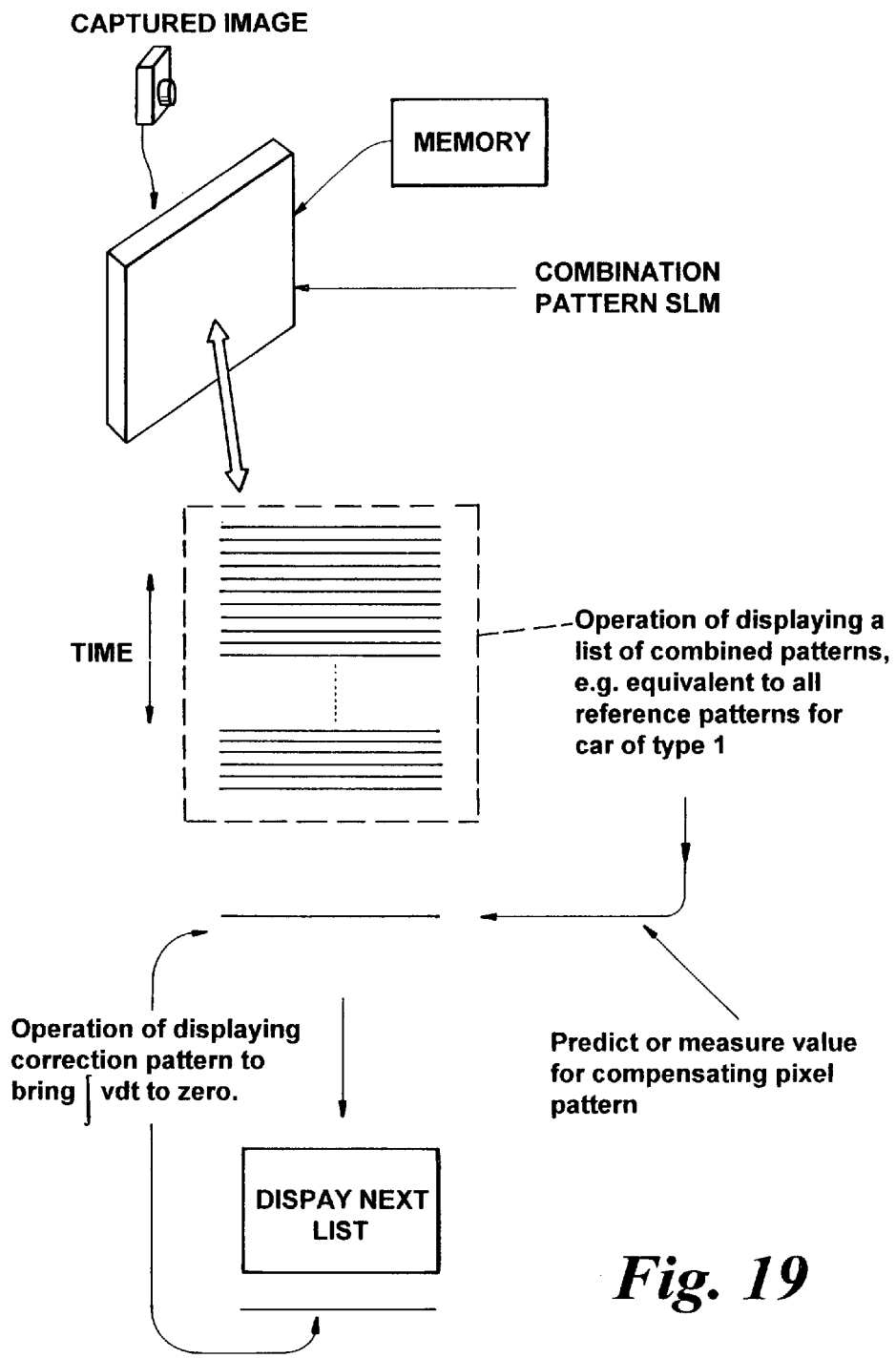
Figure 20:
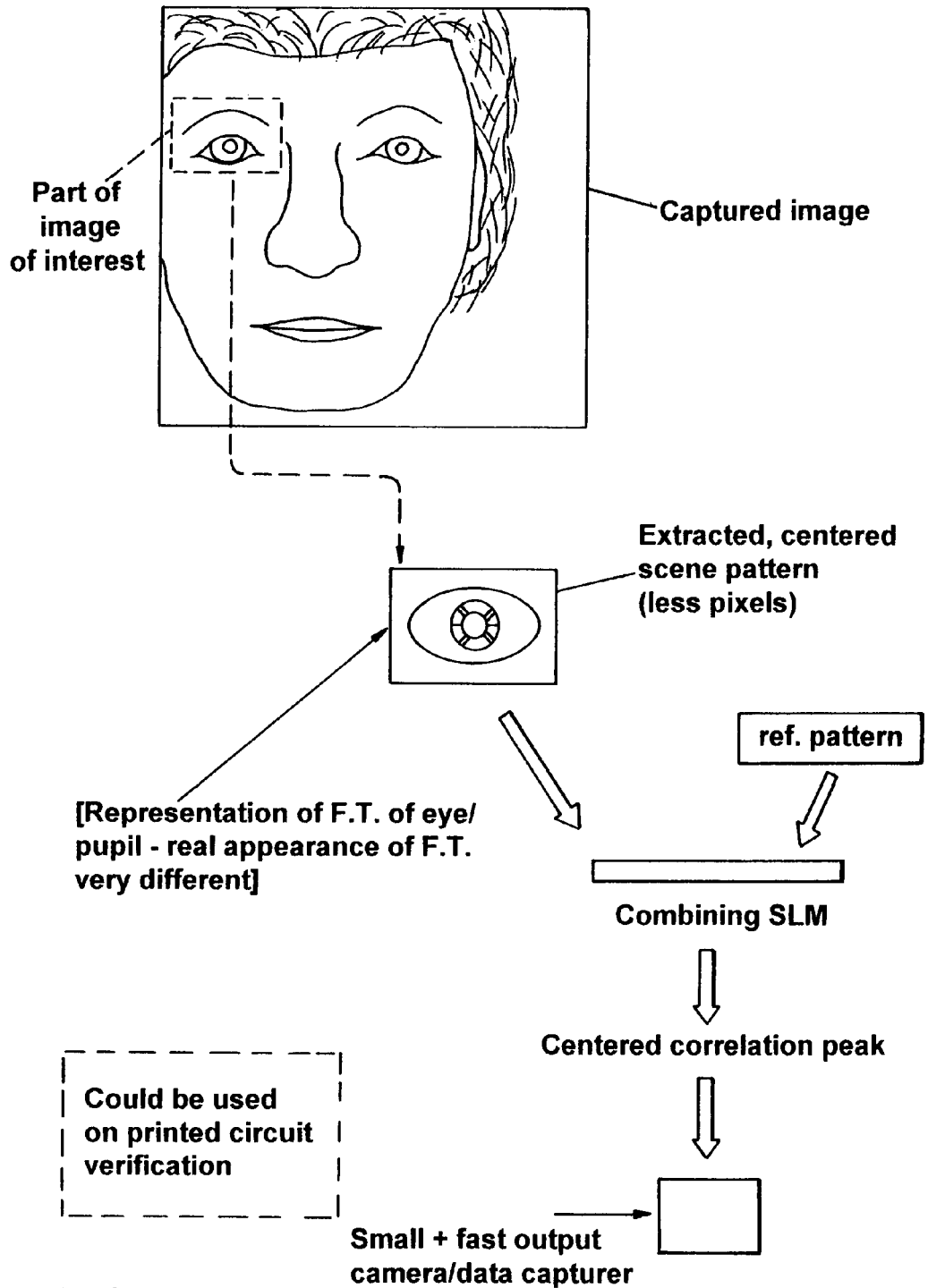
Figure 21:
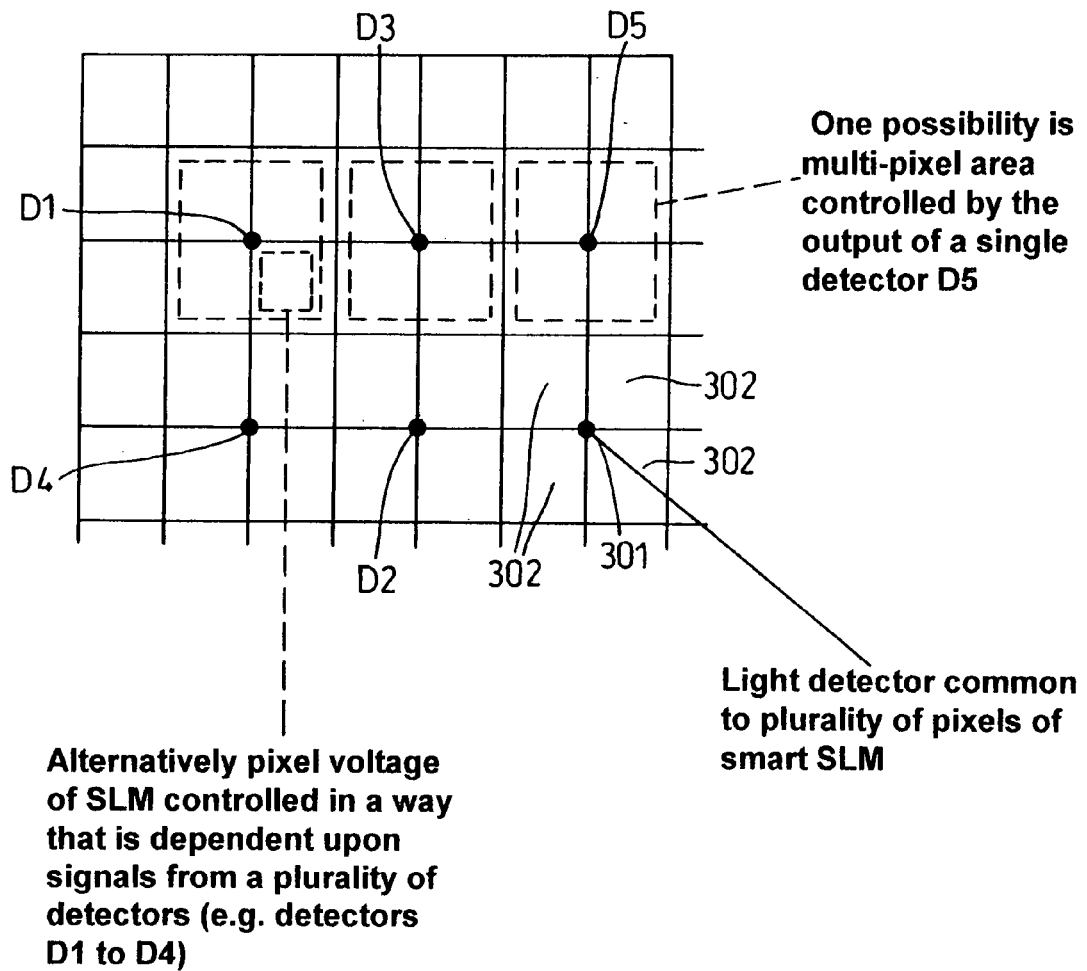

FIG. 5 is a schematic illustration of the presence of two correlation peaks in the Fourier Transform plane of a binary phase pattern. The simple example shown in a binary phase diffraction grating with two principal diffraction orders. For simplicity the Fourier Transform lens has been omitted from this Figure;

FIG. 6 schematically shows the creation of a DC and two correlation peaks formed in planes spaced apart in the direction of the optical axis using a chirp pattern;

FIG. 7 illustrates an experimentally-recorded correlation pattern without a chirp;

FIG. 8 shows the corresponding pattern produced when a chirp has been applied during processing;

FIG. 9 shows an alternate optical system for scanning a two-dimensional correlation pattern produced using an SLM and a lens across (a and b) one linear detector array; and (c) a number of linear detector arrays using an array of light sources;

FIG. 10 shows a typical problem in which light of high intensity can cause damage to an observer's retina, or blooming or overloading/glare in a camera;

FIG. 11 shows a schematic of a "smart" spatial light modulator;

FIG. 12 shows, in a side elevation, a schematic of a modified "smart" SLM;

FIG. 13 is a schematic of a refinement to an optical pattern recognition scheme in which a number of patterns are simultaneously "tiled" onto a spatial light modulator;

FIG. 14 is a schematic illustrating how a pattern recognition apparatus similar to that described in relation to FIGS. 2 and 3 can be split into two or more sections using optical fibres, so that it can be used in, for example, hazardous environments;

FIG. 15 illustrates the various terms used to define the data processed by the apparatus to produce a correlation pattern;

FIG. 16 illustrates a VCSEL array orthogonal to a linear detector array across which a two-dimensional pattern can be scanned by controlling the illumination of the VCSEL array;

FIG. 17 illustrates a detector array comprising a number of parallel rows of detectors with one alternating read-out to the left or right simultaneously;

FIG. 18 is a diagram showing how a pixel of illuminating radiation can be used to take an image of a slice of a scene to reduce background clutter, and enable a number of such slices of an object to be correlated to improve accuracy of identification and/or location;

FIG. 19 illustrates a method of reducing the time spent in minimising disassociation of liquid crystal pixels in an SLM;

FIG. 20 shows an example application of an optical correlator in identifying pupils from a captured scene corresponding to a face; and FIG. 21 is a schematic view of two possible arrangements of a "smart" SLM, including one in which each device in the array comprises a detector which controls a group of four pixels spaced around each detector.

A schematic diagram of a pattern recognition apparatus in accordance with at least one aspect of the invention is shown in FIG. 2 of the accompanying drawings. An alternative diagram, illustrating the key components parts used to construct a prototype apparatus in the laboratory, are shown in FIG. 3.

The apparatus is a hybrid system in which part of the processing is performed by digital electronics and part of the processing is performed optically. Information is converted from electrons to photons and vice-versa with the aid of two optical to electronic conversion means and one electronic to optical conversion means.

An example application is the detection of the presence of a car in a street scene. The system can be used to identify whether a particular type (e.g. model) of car is present from information held in reference data. It can also be adapted, in at least one mode of operation, to identify the location of the car in the scene.

In the example described in the preceding paragraph, an image of the scene is captured using a charge coupled device 10 such as a CCD camera. In the laboratory, a 718×512 pixel camera was used. The camera chosen was sensitive to visible light, although no assumptions should be made about the viable range of wavelengths recorded by the camera. Operation in the infrared is sometimes preferred as it operates day or night. Indeed, it is envisaged that the camera could be omitted and the system used to process other types of image or more abstract data which can be arranged in a two-dimensional array.

Another example is the identification of a person's eye from a picture of a face, as shown in FIG. 20.

The camera produces one captive scene image of 512×512 pixels every twenty-fifth of a second. Each captured scene image (or selected ones) is downloaded into a temporary store in a digital memory 11.

The digital memory 11 (or a separate memory) also stores a set of reference patterns. In the example, each pattern may correspond to the Fourier Transform of an image of either a different type of car, or to a car viewed from a different angle, or to different cars viewed from a variety of different angles and/or from a number of different distances.

The digital memory is provided as part of a personal computer (as shown in FIG. 3). This captures scene images from the CCD camera at video rates using a dedicated image acquisition board 13.

The captured scene image dataset stored in memory is passed to a dedicated transputer 14 (in the version as presently operating, but a transputer is not considered essential) which generates a scene pattern corresponding to a Fourier Transform of the captured scene image. The Fourier Transform is performed at the capture rate of the image acquisition board.

The actual Fourier Transform data used to construct the scene pattern is calculated by initially calculating the complex two-dimensional Fourier Transform of the captured image dataset using an FFT routine. Next, the transputer disregards some of the information encoded in the complex data and forms a scene pattern which comprises binary phase only data. This is, of course, non-complex data.

The reference patterns are also encoded as binary phase only data generated from the Fourier Transform of the reference images or objects.

This saves memory compared to multi-bit data. In order to ensure the system operates as fast as possible, these reference Fourier Transforms are calculated prior to use of the system and are stored in memory. If only raw reference object data had been stored, each Fourier Transform of the reference would need to have been calculated in real time. This would have caused a system bottleneck. The reference memory may be programmable under the control of the user (possibly to change the reference patterns held in active, "live", memory).

In order to recognise and/or locate a reference image in the captured scene image, the reference pattern must be compared with the captured scene pattern. For, say, four hundred reference patterns to be compared with each captured scene pattern, the process of combining these patterns must be performed at a rate of four hundred combinations within one twenty-fifth of a second if the system is to operate in real time at video capture rates.

The captured scene image is processed to produce the binary phase only data in the scene pattern. This represents a reduced-complexity Fourier Transform pattern for the image. Since the reference pattern is also in the form of a binary phase only data, the two patterns can be combined using fast simple logic circuitry, such as an exclusive-or gate. The combined image pattern and reference pattern forms a combined pattern which is displayed on a spatial light modulator (SLM) 15 driven by a controller 15*a*.

The SLM 15 used in the laboratory prototype comprise a Fast Bit plane spatial light modulator (FBPSLM) which has been developed as part of a joint collaboration between the applicant and Cambridge University, England.

The device is provided with its own control board 15*a* which includes the memory for storage of the reference object datasets. Several hundred reference patterns can be stored as binary-phase-only information. These can be grouped together in lists. For example, the reference patterns may correspond to different makes of cars. One list may comprise one reference pattern for each make The others may comprise all the reference patterns for an individual make.

The personal computer 12 controls (via a communication line) which list of reference patterns is to be accessed to form a particular combined pattern. It is preferred that a set of combined patterns are formed by sequentially shifting through all the relevant lists of patterns in turn. However prior information may be used to reduce the search or modify the order of search to specific lists, i.e. if it is only desired to identify one make of car. It will, of course, be appreciated that if the system searches list A and finds a march for pattern X control means may then use the fact that it was pattern X that matched to control the selection of the next list to be searched (e.g. list B instead of list C, which would have been searched if pattern Y has been matched).

As mentioned, the multiplication of the scene pattern with a reference pattern is performed using an XOR gate, since only binary information is present. This is a very fast process and achieves perfect alignment of the patterns because of its digital nature.

A currently available FBPSLM has a limited resolution and can only display 320×240 pixels which can be used. In this case, the FFT patterns are calculated as 512×512 pixel patterns and the data outside the central 320×240 pixels of the pattern is disregarded. This acts as a low pass spatial filtering operation. It is, however, envisaged that larger SLMs could be employed and one is currently under development. This principle of presenting to the SLM less data than is captured applies to other size ranges.

The actual combined patterns (masks) displayed by the FBPSLM, which correspond to at least part of the combined pattern, are used to modulate a light beam. As shown in FIG. 3, the light beam is generated by a laser 16 prior to passing through a beam expander and a linear polariser 17. The expanded polarised coherent beam is shone onto the FBPSLM 15 which works in a reflection mode. The light reflected from the FBPSLM defines a modulated beam encoded by the pattern displayed by the FBPSLM. The FBPSLM is capable of displaying around ten thousand patterns (masks) per second.

The FBPSLM modulates the phase of the light beam. Each pixel in the FBPSLM imparts either zero or half a wavelength of retardation onto the incident waveform (pixel by pixel). Only, the relative phase is important. The state of each pixel depends on the binary value of the corresponding sample of the second intermediate dataset. The FBPSLM thus applies a binary phase modulation pattern to the beam.

The reflected beam is Fourier Transformed optically by a lens 18. Passage of the light through the lens Transforms the modulated pattern, so as to produce in the back focal plane of the lens the required correlation pattern, which can be detected by a CCD array 19 located in the focal plane.

If any two patterns (derived from the reference and scene) match then the correlation pattern produced from the reference pattern and the scene pattern and the lens will consist of two sharply focused peaks displaced symmetrically about the origin. This is illustrated in FIG. 5 for the especially simple case of a phase-reversal grating. In addition, a large peak is formed at the origin which is essentially due to interpixel regions of the SLM. The presence of the two peaks is a side effect of the binarisation of the phase of the Fourier Transform data.

From the two peaks, it is easy to determine whether or not a particular reference image is present in a scene. If a peak is present when a reference pattern is correlated with a scene pattern, it can be assumed that the reference is present in the scene. If no correlation peaks are formed, the reference image can be assumed not to be present. The decision can be made by means of a threshold circuit.

The correlation pattern also enables the location of the reference image in the scene to be determined with some ambiguity. In general, the location of the peaks in the (x,y) plane of the correlation pattern is related to the position of the reference image in the scene.

It is possible to use this to guide an object towards the located object. For example, a drill bit may be guided towards an identified area where a hole is required. It can be arranged that as the first optical to electronic means is steered towards the reference object in the scene the two peaks converge into one.

The output camera placed in the focal plane of the lens produces an output signal which can, in turn, be analysed to detect the presence and/or location of a reference object in the scene. In a simple case, the output of the camera is integrated over time, e.g. so as to cover a number of reference object scales and/or orientations to reduce the required readout frame rare of the camera from the current ideal value of say 10 kHz.

Alternatively, a signal may be produced from the pattern recorded by the camera which could be digitally processed to identify correlation peaks. For example, the captured scene image representing the scene could be displayed on a screen and a marker may be overlaid to indicate the location of a reference object in the scene. This marker could, for instance, be a cross-wire. This could, for example, be useful when using the invention in combination with a medical laser adapted to burn away certain tissue parts and not others if it is appropriately aligned and powered.

It will be appreciated that the first optical to electronic conversion means (the input camera) could be capturing an image frame at the rate of twenty-five frames per second. With a set of four hundred reference patterns, ten thousand patterns will be displayed on the SLM each second. This, in turn, means that the output camera ideally needs to have an output rate of ten thousand frames per second, but this is not essential (for example the output signal could be integrated).

Having described the basic pattern recognition scheme, several advantageous features, many of which are optional, will be described hereinafter. They may comprise inventions in their own right, not necessarily restricted to the field of pattern recognition.

Binary-Phase-Only Transforms

As described, the essence of the invention is the combination of digital and optical Transforms in a pattern recognition scheme.

The preferred Transformation for use on the digital data is 1-bit binary-phase-only data derived from the Fourier Transform. The use of binary phase only data is eminently suited for use with fast binary modulators such as ferro-electric liquid crystal SLMs, including the FBPSLM. Multiple bit-level Transform data could be used as an alternative, although for maximum benefit a spatial modulator based on several modulation levels would be needed. We are unaware of any suitable commercial devices of this type at the present time.

The key benefit of using phase-only Fourier Transform information (rejecting amplitude information) is that it improves the detection of references in "noisy" scenery with a non-white spatial spectrum.

The main reason for using binarised phase-only information for the first intermediate dataset and reference datasets is its inherent compatibility with liquid crystal SLMs with binary responses, and the faster speeds at which binary data can be multiplied using, say, an exclusive-or gate.

In general, the use of binary phase information results in a degradation of performance due to the coarseness of the quantisation of the phase data. Furthermore, binary data results in two correlation peaks being formed in the output plane of the Fourier Transforming lens as shown illustratively in FIG. 5.

The production of the two peaks is discussed in the prior literature. Of course this is also true of the entire output field, not just the correlation peaks. In general this behaviour is undesirable because it leads to ambiguity in locating an identified target. However, this very phenomenon may be exploited in reference object identification and tracking.

It can be shown that the location of the correlation peaks in the output plane (relative to the centre) is a measure of the relative displacements of the reference object in the picture used to generate the reference dataset and the item to be identified in the captured scene. For example, if the object and reference are equally displaced from the origins of their respective scenes, there is no relative displacement, and a single output peak occurs at the origin.

It has been established that for the pattern recognition apparatus shown in FIGS. 2 and 3 to operate correctly the reference can be located arbitrarily. In the case of object tracking this provides a valuable degree of freedom. Since it is often required to track a spot on a moving sought object present in the scene. It is convenient to make this spot the centre of the reference image (used to create the reference pattern) for each scale/orientation of the reference object sought. In this case when the spot on the reference object is in the centre of the input plane, the output correlation peak is at the centre of the output plane. Thus, in the tracking process the objective is to keep the correlation peak at the centre of the output plane when the desired region of the scene object is always centrally aligned with a tracking device (e.g. a camera or drill). In the case of the pattern recognition system of the present invention employing binary phase SLMs, this has the added advantage that in these circumstances the output peak has full intensity, the two symmetrical peaks discussed above merging into one strong central peak. This fact can be used as an aid to reference object identification and tracking and exploits the fact that the output peak is not split when the location of the scene reference object matches that of the reference perfectly. Of course, implicit in this statement is the fact that the reference object is identified in the processor. One example of tracking an object might be moving a camera to track the number plate on a moving car and then taking a photograph of that number plate. Another example might be keeping a laser or drill aligned on a moving workpiece prior to creating a hole in the workpiece.

There is another interesting consequence of the use of phase-only filters when the scene is dominated by the object and perfectly matches the reference object, so that there is a perfect phase-conjugate relationship between the (binarised phase-only) Fourier Transforms of the object and reference: in these circumstances the field exiting the SLM is a plane wave of uniform amplitude (assuming the input illumination is uniform) so that the output is theoretically an Airy function, independently of the object/reference. This may be useful, as it has very low sidelobe levels, in contrast to the ACF of a general object/reference and a fixed intensity. If the illuminating laser has a Gaussian intensity profile, the output is further smoothed. This Gaussian profile could reduce the sensitivity of the system to a precise match between object and reference, since it is equivalent to the use of a filter which reduces the high-spatial-frequency content of the output.

It may therefore be desirable to provide a spatial filter, especially in combination with a binarised system.

Chirp Filter

Recognising that in certain circumstances the presence of the two correlation peaks in the output plane of the Fourier Transforming lens is disadvantageous, it is proposed to include a chirp (non-linear phase term) into the design of the reference binary phase-only Fourier Transform datasets (reference patterns). A chirp is closely related to a zone plate lens. It has been shown theoretically and in experiments that this has the effect of focusing the two correlation peaks to different planes along the optical axis. It has also been shown that the DC peak at the origin is shifted into a different plane as well. By placing the output camera in one of these planes, only one peak will be in focus. This allows the unwanted DC component and one peak to be reduced in magnitude at the output camera. The light corresponding to the unwanted peaks is spread out across the output plane. This is shown in FIG. 6.

The chirp phase pattern is in one embodiment calculated and added to the reference phase pattern before the resultant reference pattern is binarised. The resultant combined spectrum from the reference and input patterns is then displayed on the FBPSLM and Fourier Transformed optically by a lens. It can be shown that due to the chirp the two correlation peaks produced are focused to planes either side of the focal plane of the lens in the z-direction at distances $z'$ and $z''$. It can also be shown that the positions of the correlation peaks in the x-y plane are scaled depending on the size of the chirp employed.

FIGS. 7 and 8 show experimentally recorded results of the correlation signals produced by reference patterns with and without a chirp respectively. FIG. 7 was recorded with the camera placed at the focal plane of the lens when no chirp was applied. FIG. 8 was recorded when a chirp was applied: the camera was displaced in the z-direction until one correlation peak was in focus at plane $z'$. FIG. 8 successfully demonstrates that the second correlation peak and the DC component are de-focused.

Experiment has shown that if the chirp is calculated as a binary pattern and then added to a binary pattern then both peaks produced are focused to the same x-y plane. This is therefore not necessarily desirable for a binary pattern because both peaks would be in focus (although a beneficial effect is the de-focusing of the peak at the origin).

It is conceived that it may be possible to design the chirp as an external structure to the SLM, which is either fixed or variable.

Experiment has shown that for pattern recognition the chirp should, ideally, be added before the pattern is binarised and can be added to both patterns or to only one of the patterns. It is probably more convenient to pre-calculate the pattern and add it to the reference pattern. It is therefore possible to compose a set of patterns with different chirps so that the chirp can be chosen randomly from a list in real-time or sequentially to produce a scanning focus in the z-direction. Combination with a linear chirp allows the focus to be varied in three dimensions in real-time. For example, the current design of the FBPSLM allows the chirp pattern to be changed approximately ten thousand times per second. Applications could include the memory access of optical discs and holographic memory without the requirement for mechanically moving parts.

In some applications a variable chirp may be required, for example, time/frequency analysis in Wigner Transform or Ambiguity function, where an unknown chirp may be present in the input signal. The purpose of applying additional chirps is to find the one which negates the unknown chirp in order to retrieve a desired signal.

The chirp could also be used by an SLM with more than two modulation levels (i.e. not binary). This would have the advantage that multiple modulation levels produce only one correlation peak and the optical throughput is therefore more efficient. Although the ambiguity of sought-object location is removed by having only one correlation peak there is still a problem caused by the presence of a DC peak. Therefore, it is still beneficial to use the chirp to defocus the DC peak. This property has not been discussed in the literature to our knowledge.

It should also be noted that the chirp has a similar mathematical description to a lens and it has been shown experimentally that it is not necessary to use a lens in conjunction with the chirp. This simplifies the optical system design.

In practice a chirp function may be simply multiplied with an FFT pattern. It can be pre-calculated or even accessed from a "look-up" table. Alternatively, the chirp could be applied to the signal by convolution.

The Spatial Light Modulator

In order to implement the pattern recognition scheme it is essential to provide a spatial light modulator which is capable of displaying the combined pattern as a phase encoded spatial mask.

One suitable binary SLM is known as the Fast Bit Phase Spatial Light Modulator (FBPSLM). Other SLMs (including other silicon backplane devices) could be used.

The FBPSLM comprises a 320×240 pixel array with a fill factor of 65%. This allows a maximum frame rate of 22.7 KHz, which is sufficient for the display of in excess of ten thousand patterns per second. The pixels are of the DRAM type.

In the FBPSLM, as in the majority of SLMs, an electric field is applied across each pixel. For a binary SLM, each pixel will have two modulation states. For phase modulation, these will correspond to different retardations.

In order to avoid dissociation of the pixel material under a net electric current the voltages applied should, ideally, be varied (e.g. alternated) in polarity so that the net voltages seen by the pixel material over time is substantially zero of DC-balanced.

In the prior art, a DC balance state has been achieved by displaying a pattern and then displaying the inverse pattern with both patterns displayed for the same length of time, i.e. displaying an inversed image after every correlation/convolution image has been displayed. This, however, results in half of the display time for the SLM being redundant. In a pattern recognition, where speed is important, this redundant time may place a limit on the overall number of reference correlation's that can be performed in a given time.

In order to reduce the amount of redundant time in the SLM (both in the pattern recognition scheme shown in FIGS. 2 and 3 and in any other system incorporating an SLM) it is proposed to generate a list of patterns to be displayed on the SLM. The voltages applied across each pixel over time when displaying the list can then be summed. A single pattern can then be calculated from the sum value and a single pattern required to produce a DC-balance can be displayed on the SLM. The patterns in the list may be displayed so that some have a negative voltage and some have a positive voltage to approximate to a zero net voltage. They may be displayed as alternate positive or a negative voltage patterns.

In the pattern recognition system, the voltage applied to a pixel for, say, two, three or four or more patterns can be summed. It is envisaged that a list of patterns would have perhaps hundreds of combined patterns (combined scene pattern and reference pattern). It is envisaged that a list will comprise all of the combined patterns generated by a reference pattern set for a particular article to be identified—that is to say the list could be displayed on the SLM and then after displaying all correlation combined patterns for a particular predetermined article the SLM pixels/material is biased by a biasing voltage to compensate for the net effect of the voltages applied by the list. A balance voltage can then be calculated and used to control the pixel. The balance pattern needs only to be applied once for each summation, but may be of long duration and different for each pixel—some may need to flip i.e. to negative or positive, in this period. This is shown in FIG. 19 of the accompanying drawings incorporated in an optical pattern recognition system where a combined pattern is to be displayed on the SLM.

The smart SLM can have upper and/or lower thresholds for light intensity and alter its interaction with incident light dependent upon the intensity of the incident light. The value of these thresholds cap preferably be changed by a user independently e.g. by using a programmable smart SLM.

It is envisaged that the thresholding function of a smart SLM could be performed digitally, and only signals from a pixel that were above a predetermined (possibly variably controlled) value would be passed on by the pixel.

Alternative Pattern Recognition Technique

In the embodiment of FIGS. 2 and 3, the correlation pattern is focused onto a CCD camera. When large numbers of reference/image correlations are made for each capture image, considerable strain is placed on the speed of the output camera. For instance, if four hundred references are correlated per capture image, and the capture camera is operated at a video rate of, say, twenty-five frames per second, then the output camera must process ten thousand patterns per second. It is envisaged that the output camera may therefore place limits on the maximum number of reference correlations that can be made.

In some circumstances, e.g. if the input camera is zoomed onto a "target" it is fairly central in the camera's field of view and the correlation peak is constrained to be near the centre of the output field as discussed earlier. Therefore an Output camera of modest size (e.g. 48×48 pixels) and high frame rate, several kHz, can be used.

Figure 9A:
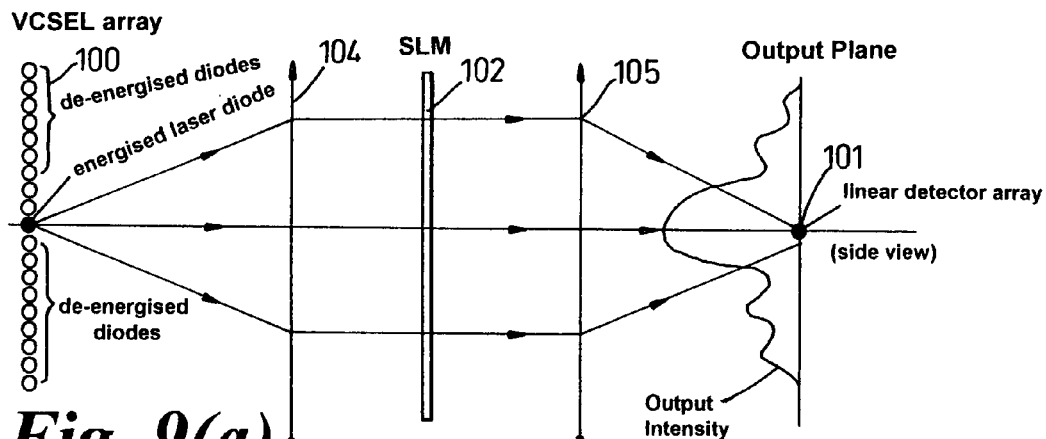
Figure 9B:
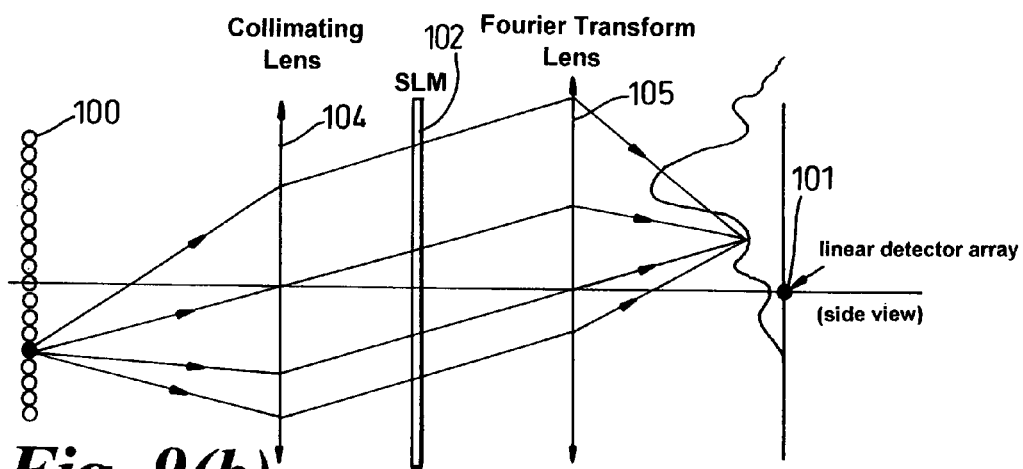
Figure 9C:
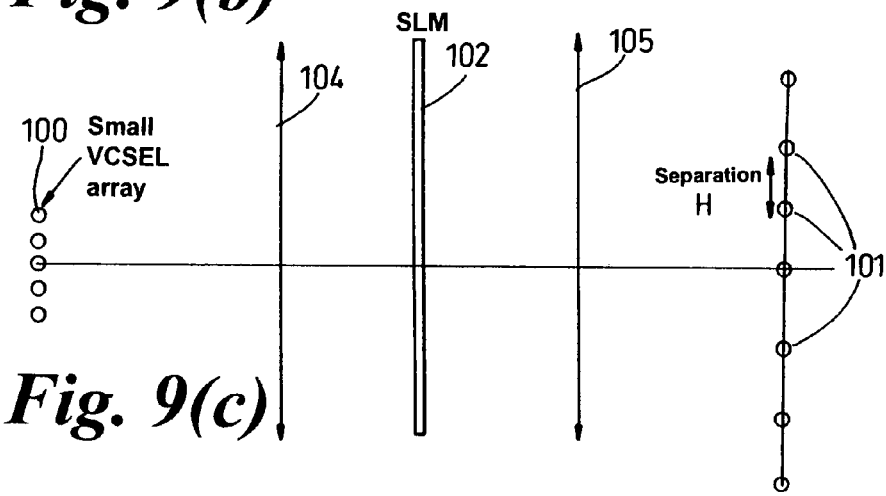

In order to remove this potential bottleneck, an alternative optical scheme has been developed as illustrated in FIGS. 9(a) to (c).

As shown in FIGS. 9(a) to (c), the laser light source has been replaced by a VCSEL array 100. The CCD camera has been replaced by a linear output detector array 101. The VCSEL array comprises a linear array of laser diodes, the centre of the array coinciding with an axis passing through the centre of the SLM 102 and focusing lens 104 and 105 (where provided). The linear detector array is also centred about this axis, but is orthogonal to the VCSEL array, as shown in FIG. 16.

In order to appreciate the functionality of the system shown in FIG. 9, assume that one hundred patterns are generated on the SLM per second. The image focused on a CCD camera (as in FIG. 2) will typically comprise 512 rows of 512 pixels. In a modified camera, each row of pixels can be read out in parallel, all 512 rows being read in one hundredth of a second. This could in itself be a useful modification to a CCD camera, as all 512 rows could be read in parallel. Each output can be passed through a threshold circuit to detect correlation peak(s) corresponding to the presence of the reference object in the scene.

The system shown in FIG. 9 solves the problem in a different manner by "moving" the light source so that the two-dimensional output pattern is stepped across a linear array.

To achieve identical results to a 512×512 pixel CCD array, the VCSEL could comprise 512 laser diodes, and the linear array could comprise 512 detectors. By switching one laser diode on at a time, and cycling through all 512 diodes within the time that a single pattern is displayed on the SLM, the whole two-dimensional pattern can be scanned across the linear array.

In practice it may not be convenient or feasible to implement such a scheme by stepping all (say) 512 rows over a single linear detector array. A possible solution to this difficulty is to use a relatively small number, n, of such linear arrays, as shown schematically in FIG. 9(c). In this case the number of VCSELs required is 512/n. In the example illustrated in FIG. 9(c) the separation of the output detector arrays, H, is the same as the reduced extent of the VCSEL array if the lenses are identical. "n" may be 1, 2, 3, 4 or more.

In a refinement shown in FIG. 17, a number of rows of detectors are provided. Each row is read out in alternate directions, i.e. first row to the left, second to the right, third to the left, etc.

It is believed that the VCSEL array concept will not work with a true Vander Lugt scheme. However, it is not difficult for the skilled man to establish which optical arrangements will work with the scanned linear detector idea—the one disclosed does work.

"Smart" Modulator

The use of these is not restricted to correlators.

One possible solution to the problems of high-speed readout of correlation patterns has been described as an alternative to a CCD camera. However, for many applications, the use of a CCD camera may be the best solution. For example, where the exact scale/orientation of a reference in a scene is unimportant, the output from the CCD could simply be integrated over time to detect correlation peaks. Unfortunately, at very high speeds, the build-up of side lobes and background clutter signals many swamp the correlation peaks.

In order to solve this problem, the applicant has developed a "Smart" spatial light modulator which can be adapted to act as a non-linear filter, which can in one mode be arranged to pass only strong optical peaks which, for example, correspond to a correlation peak. Since this would remove low level background clutter, interrogation of the integrated output signal from a CCD becomes an attractive proposition. This is especially true if all references are centred to a common point, since the output peak will then correspond to that point regardless of scale or orientation of the reference.

A different problem which could also be solved by a "smart" SLM is shown in FIG. 10. A distant scene 200 is observed by the viewer through a lens L 201, which forms an intermediate image in the plane P1 of FIG. 1. A bright spot B1 causes a bright spot B2, in this intermediate image plane, and causes a bright spot B3 on the retina 103 of the viewer.

The bright spot B3 may dazzle the viewer or damage the retina or cause blooming in a camera (or over-exposure in a conventional camera with a film). The proposed "smart" SLM would limit the intensity of the bright spot B3.

A simple "smart" SLM is shown in FIG. 11. It comprises a rectangular two-dimensional substrate 300 carrying an array of identical elements, all powered by a common source (i.e. battery) through a conducting electrode structure provided on the substrate. The electrode structure could be metallic or formed from an optically-transparent conductor such as Indiun Tin Oxide (ITO). In the SLM shown in FIG. 11, the detector 301, an associated amplifier (not shown), a comparator (not shown) and a transistor (also not shown—and in some embodiments not present) occupy a small area separated from a larger transmissive area of liquid crystal pixel 302. By this construction, when the liquid crystal is connected to an electrical potential by the one transistor, most of the light passes through the SLM pixel. If a voltage is applied the crystal changes to attenuate the light. (In this version the SLM is configured as an amplitude device, not a phase device, and need not be liquid crystal.)

It is also possible to make such a device operate directly form the detector which is in series with a resistor R. The voltage across R: is V=iR, i=current which is proportional to optical intensity. This voltage is applied across the modulator, e.g. liquid crystal.

The SLM of FIG. 11 functions as follows. Light incident upon the detector 301 generates a small photo-current. This is amplified by the amplifier and fed to one input of a comparator. The other input of the comparator is connected to a reference voltage. When sufficient light is incident upon the detector to produce an input to the comparator greater than the reference, the comparator output will trip, in turn operating the transistor to switch the associated liquid crystal pixel 302. Thus, it will be readily appreciated, that by choosing an appropriate reference voltage dependent upon the detector sensitivity and amplifier gain, the pixel can be made to switch at a predetermined incident light intensity.

The simple SLM shown in FIG. 11 will block off all light above a certain threshold intensity (in fact it is difficult to block the light completely and it will be severely attenuated to a set degree—i.e. the pixel is either "clear" or "dark").

In order to limit the light intensity rather than cut-out light if it exceeds the threshold, the alternate modulator shown in FIG. 12 has been devised. In this arrangement the detecting element is located behind its associated pixel rather than to one side. In this case, a bright spot will not be completely extinguished, but will be limited to a threshold level which is self-consistent. This arrangement would be preferred for eye protection for example, or for use with a camera.

An alternate smart SLM is shown in FIG. 21. In this arrangement, one detector 301 controls a set of four adjacent pixels of modulating medium 302.

To be suitable for use in the pattern recognition scheme as a device for removing background spurious signals, the connections to the comparator could be reversed (or the operation of the transistor could be reversed), or some other modification made, so that the pixel blocks out light until the light on the detector exceeds the threshold level. This can allow integration of the thresholded signals to be feasible, since only the strong correlation peaks are passed to the output camera.

In a more general case, the output of the detector could be connected to any logic circuit to control the operation of each pixel. One detector and associated circuit could be associated with more than one pixel. For example, the detection could be provided at the centre of a 2×2 array of pixels in the SLM.

It is envisaged that a "smart" spatial light modulator can be incorporated into a correlation system in a number of ways.

Firstly, it is envisaged that a smart SLM adapted to attenuate high intensity portions of the image scene could be provided in front of (or in an intermediate image plane in front of) an input camera adapted to capture the scene image. This could, for example, prevent a bright sun or light from causing the camera to bloom, or film to be over-exposed. The sunlight could be completely blocked, or just more preferably attenuated to a lower intensity. The smart SLM filter could be built into the camera, or built into a lens unit, or be an add-on filter unit which is attached to the camera, or associated in some other way.

A similar "smart" SLM could also be incorporated into the optical correlator after the SLM used to display the combined patterns or chirped combined patterns but before an output camera. In this case, if the combined signal includes a chirp to defocus one of the correlation peaks in a binary system a camera could be located in the plane furthest from the SLM which contains a correlation peak. A smart SLM could then be located in an intermediate plane which will contain the other correlation peak. The smart SLM could attenuate the unwanted peaks in that plane to improve discrimination. A similar arrangement could be used to remove the DC peak by placing a smart SLM in the plane which contain the DC peak. These ideas could be an independent invention. The device would have a programmable discrimination-altering filter.

An alternative smart SLM which removes (or at least attenuates) light below a threshold intensity whilst passing (or reflecting if a reflection device) light with intensity above the threshold could be placed in front of the output camera. It could form part of the output camera itself. This would be adapted to remove background clutter. In such a case, the output of the output camera could be integrated over a number of combined patterns. If an output voltage over a predetermined level is produced, it can be assumed that reference from the reference pattern set used to generate the combined patterns was present. If necessary, it would then be possible to go through the identified reference set again without integration of a number of patterns to identify which one of the patterns of the reference set of patterns equated with the scene image, possibly also centring the patterns on any display that may be used (if a display is used). However, it may only be necessary to know that a reference is there, not its scale and orientation, in which case no second comparison operation with the references would be necessary.

In one system, the reference patterns are divided into lists of patterns. The lists may consist of a master list and sublists. The master list may contain at least one representative reference from each sublist. For example, each sublist may comprise different views of a particular car, with the master list comprising a view of each type of car. Once a correlation is identified using the master list to say a car is present (of some kind), the sublists could be used in turn to identify more clearly the specific view of the car. This could prove more time efficient in identifying the presence of a reference than running through all the reference patterns. To identify exactly which reference produced the correlation peak, the combined patterns can be displayed on the SLM in turn and the presence of a correlation peak carefully monitored. This is shown diagrammatically in FIG. 19.

The reference patterns could be synthetic discriminant functions, both in this last idea, and in earlier discussions.

An alternate method of operation of the pattern recognition system described herein has also been developed. This is particularly useful when the object sought needs to be identified i.e. distinguished from very similar objects. A light source is provided which is adapted to illuminate the scene with a series of short duration bursts of light. Of course, wavelengths other than optical could be used provided the capture camera is compatible (or indeed other signal transfer propagating mechanisms other than e.m.). This method is shown in FIG. 18 for a typical scene.

In a first step, a short pulse of radiation is emitted. The pulse may be of the order of 1 nano-second, giving a spatial extent of, say, 30 cms for a visible wavelength pulse. The optical field reflected is then passed through a pulsed image intensifier and recorded on a camera. The captured image recorded by the camera is then processed to form a first scene pattern as shown in the embodiment of FIGS. 2 and 3 and compared with one or more references. This is then repeated for a second pulse which can be detected allowing for elapsed time which is greater than that at which the first captured image is logged.

An alternative version is to send out a first pulse and measure return time to get the range—it then acts in a rangefinder mode. It is then possible to perform a series of ranges around this average.

By varying the delay time between transmitting the pulse and capturing the returned signal, a form of three-dimensional image of the scenery can be constructed. Each "layer" of the image may be correlated with one or more reference images. This also enables an object in a scene that would otherwise be obscured by background clutter to be identified. The spatial resolution is dominated, in practice, by the length of the emitted pulse, as the length of time for which the intensifier operates. As shown in FIG. 18, unwanted reflections from parked cars and bushes can be eliminated. This is a different advantage, in addition to the possibility of three-dimensional imaging Further Refinements Another advantageous feature of the new hybrid digital/optical pattern recognition apparatus is that it is possible to "tile" more than one mask pattern onto the SLM to produce several corresponding correlation patterns in the output plane of the focusing tens. This is possible because it is not necessary to have the DC frequency of the pattern on the optical axis (as in a classical Vander Lugt correlation).

Figure 1:
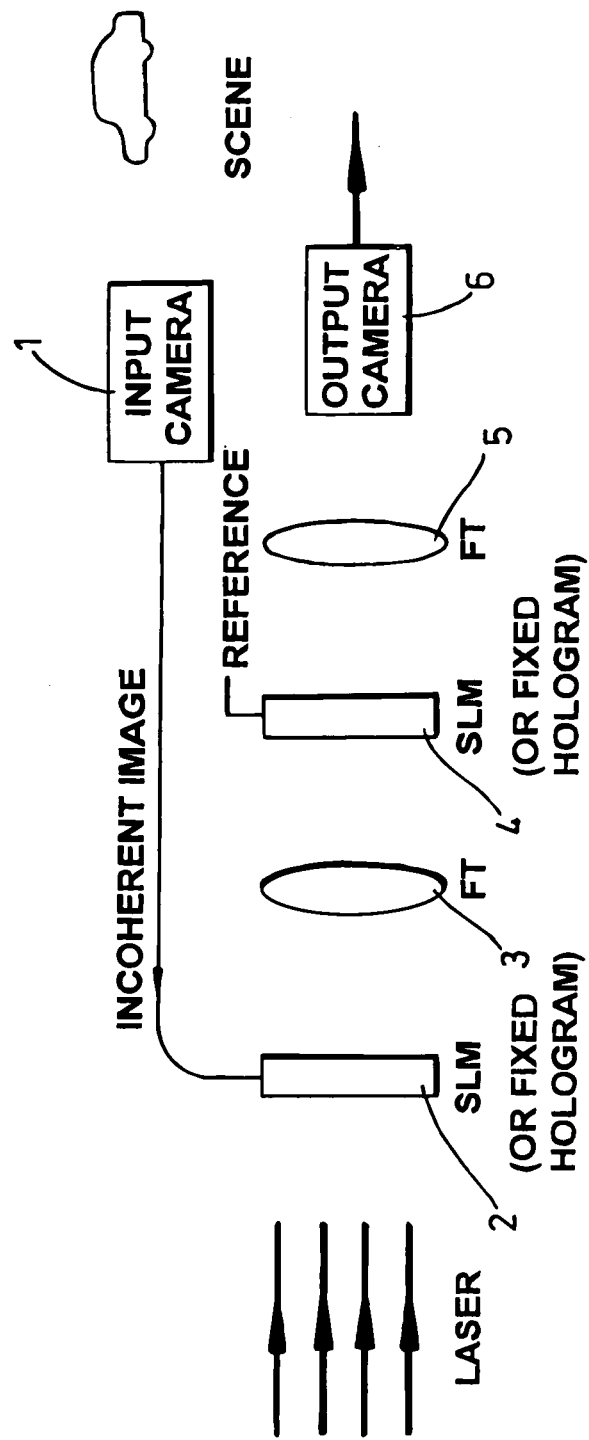
FIG. 1 is an illustration of a typical development of a prior art Vander Lugt optical correlator for use in pattern recognition.

In a classical optical correlator, as shown in FIG. 1, a defined optical axis is present. When the image scene is Fourier Transformed by the first lens, the spatial frequencies are all centred on axis. The reference pattern which must be placed on the Fourier Transform plane must be similarly aligned on this axis.

Figure 13A:
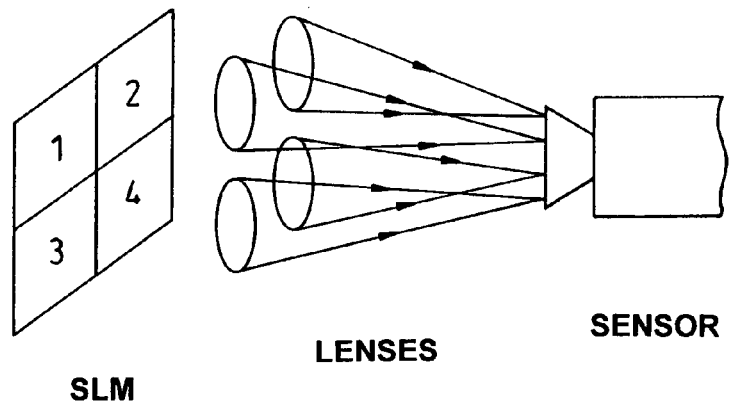
Figure 13B:
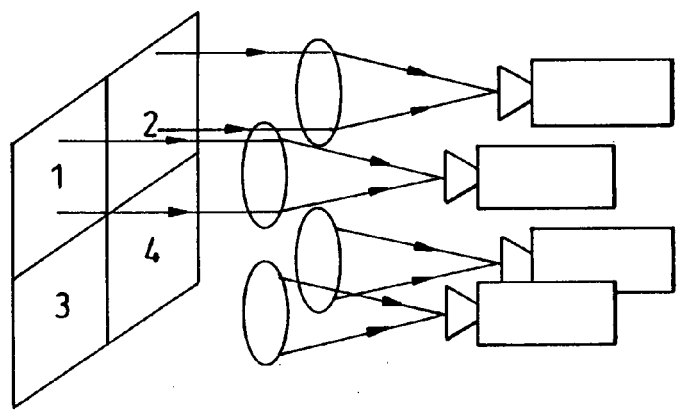
Figure 13C:
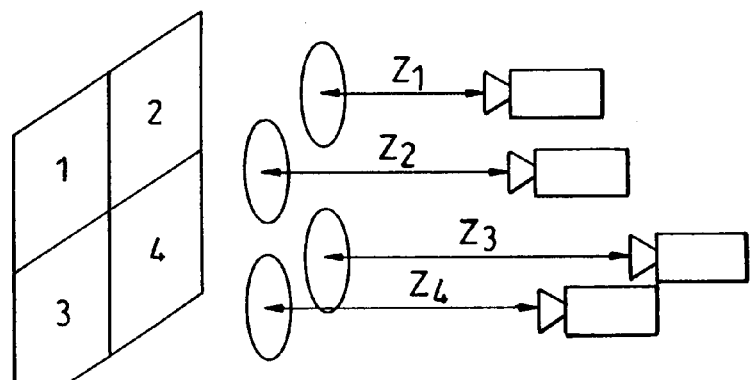

Using digital Fourier Transform techniques to process the first stage of the data, the spatial frequencies have no defined order. This allows the SLM to display, say, four or more patterns simultaneously. For example, these may be tiled in four quadrants as shown in FIGS. 13(a) to (c). This has a number of distinct advantages.

Firstly, the spatial frequencies displayed on the SLM, as per FIG. 13, could be arranged in any order (as distinct from having a requirement that spatial frequencies be carefully ordered away from the optical axis—we can map the same combined pattern to different regions of the SLM and still operate properly). Secondly, the rate of correlation can be increased as the number of tiled patterns increases. Each tile will produce its own correlation pattern when Fourier Transformed, and one or more detectors (such as CCDs) could work in parallel on the patterns.

The use of tiled patterns would also allow a number of different chirp patterns to be applied to a single combined pattern in parallel. This may be desirable to separate the correlation regions and avoid cross-talk. Furthermore, a multi-spectral image could be captured (say, red, green, blue colours) which can be processed in parallel, each tile corresponding to one colour for example.

A yet further modification is shown in FIG. 14. In this arrangement the pattern recognition apparatus 500 is split into two sections. One section 501 comprises an optical input device 502 which is connected via an optical cable 503 to a computer 504 or other electronic device. The optical input device receives the input capture data which it transmits over the optical cable.

The computer, which in this example is battery-powered and is provided in a self-contained unit, generates the scene images and scene patterns and transmits them over a second optical fibre 505 to a base unit 506. This contains the digital signal processing circuit needed to perform the Fourier Transforms. It also contains a spatial light modulator and optical lens (where provided).

An advantage of this arrangement is that the optical input devices can be located remotely from the electronics by up to tens of kilometres. The optical fibre is immune to electromagnetic interference and so can enable input capture data to be obtained in electromagnetically noisy environments.

Also, by separating the relatively inexpensive optical input device and the computer from the expensive modulator and digital signal processing hardware, they become individually less expensive and smaller. We can input the signals from a plurality of input devices (optical or not) to a common correlator, which can analyse them in turn, or simultaneously.

It will readily be understood that the present invention comprises, when looked at one way, a hybrid digital/optical correlator. Many advantageous features have been disclosed, many of which have applications far wider than the field of pattern recognition. For instance, many of the disclosed apparatus and methods, whilst developed primarily as part of a complete pattern recognition system, will find wider applications in other fields. Protection may be sought for any novel individual feature in its own right.

It will also be understood that the expression "Fourier Transform" is intended to include different types of Transform including Sine, Cosine, Hartley, Wavelet Transforms, etc. Whilst each Transform has slightly different properties, they can all be implemented digitally in order to define the same patterns, reference patterns, and combined patterns used in the disclosed pattern recognition apparatus.

This application has discussed performing the invention with "light". The invention can, of course, be performed with optical light or electromagnetic radiation of any wavelength, and nmr (mri) imagery. Indeed, medical imaging/medical applications is a field of great potential for the inventions—controlling the alignment and/or movement of a medical laser relative to known body structures, possibly automatically or remotely and, for example, only allowing the medical laser to operate when a correct pattern match has been found (it is correctly aligned) may be an application.

It is also possible to use the invention in non-e.m. wave conveyed scenes, for example with sound or ultrasound, or other compressive wave energy transfer. Thus, the reader should interpret "light" to cover all of the above, and perhaps "information-carrying propagator" would be an appropriate wider term. As mentioned earlier, the "scene" need not represent a physical thing or picture.

There now follows Appendix 1, which is a glossary of terms, and Appendix 2, which is a list of references that the reader is hereby directed to read before construing this patent application.

Appendix 1

Terms and Simplifications used in this Patent Application pattern recognition is a term used to describe the process of identifying the presence of a reference object in a scene.

The scene image and reference object may be real things such as cars (objects) in a queue (scene), or may be more absvact quantities such as arrays of data or even a string of data. For simplicity they are always referred to as the scene image and reference object.

Synthetic discriminant functions are effectively combinations of reference data, for example a combination of a car sideways on and head on. They are used to reduce the number of references necessary to identify the presence of an object in a scene.

The text often refers to optical-to-electronic converters—these are typically cameras or detector arrays.

The text often refers to electronic-to-optical converters—these usually refer to the use of SLMs, Spatial Light Modulators. The SLMs described as examples in the text are invariably pixellated devices, i.e. comprise arrays of individual modulating elements. Many types of SLM exist. The most common devices employ Liquid Crystals or micromachined elements as light modulating means.

SLMs can operate in many ways, for example in transmission or in reflection. In the text we shall for simplicity always refer to SLMs that work in transmission. It is to be understood that SLMs working in reflection can also be used slightly modified configurations, and that protection for those is intended.

The patterns displayed on SLMs are referred to as masks.

In the systems described a lens often forms the Fourier Transform of the mask pattern, the output being monitored in the back focal plane of the lens. This forms the output (pattern) of the correlator. Nevertheless we often refer to this as focusing, since in the correlation process when the sought reference object is present in the scene, light is focused to form a correlation peak in the output focal plane.

Ideally, there is a distinction between Fourier Transforms and Inverse Fourier Transforms, but the difference is of no practical importance, and all such Transforms are described as Fourier Transforms here. Similarly the term Fourier Transform is used to cover closely related Transforms such as cosine Transforms.

The process of correlation between reference objects and the scene can be performed in the spatial frequency domain. The first step in this process is to multiply the Fourier Transform of one with the complex conjugate of the Fourier Transform of the other. (The second step is to take an inverse Fourier Transform of the product.) In the case of phase-only data, in the first step it is only necessary to calculate the difference of the phases. In the case of binarised phase-only data this is most easily accomplished through an XOR logic operation. In the text "combined" should be understood in this sense.

The patterns described in the text are generated from the Fourier Transforms of the object or scene.

The location of an object in a scene is defined by co-ordinates (x,y).

A chirp waveform is an analogue waveform of constant amplitude and linearly varying frequency. A two-dimensional binary optical approximation to this is a phase-reversal zone plate lens. For simplicity in the text we refer to this as a zone plate lens.

In many structures claimed a zone plate lens is included, often in conjunction with a conventional glass lens. Unless specifically mentioned it can be assumed that this zone plate lens is absent in the descriptions of operation. In this case the correlator output is invariably taken in the back focal plane of the real glass lens.

We often refer to "smart" SLM. This should be understood as a device in which the transmitted (or reflected) light intensity is determined by the incident light intensity through the intermediary of an applied voltage. This voltage may be applied to pixels neighbouring individual light detectors.

Appendix 2

REFERENCES

1. J. W. Goodman, "Introduction to Fourier Optics". McGraw-Hill Companies Inc., Second Edition. p 9 (1996)
2. A Vander Lug. "Signal detection by complex spatial filtering", IEEE Trans. Inf. Theory IT-10, p 139-145 (1964)
3. J. W. Goodman. "Introduction to Fourier Optics" McGraw-Hill Companies Inc., Second Edition, pp 237 (1996)
4. A. J. Seeds, "Quantum wells and lasers: novel applications in opto-electronic systems". Fifth Opto-electronics Conference (OEC'94) Technical Digest, p 448-449 (1994)
5. J. L. Homer, P. D. Gianino, "Phase-only matched filtering". Appl. Opt. 23, p 812-816 (1984)
6. D. Psaltis, E. G. Paek, S. S. Venkatesh "Optical image correlation with a binary spatial light modulator", Opt. Eng 23, p 698-704 (1994)
7. W. A. Crossland, T. D. Willdnson. T. M. Coker, T. C. B. Yu. M. Stanley. "The Fast Bit Plane SLM: A new ferroelectric liquid crystal on silicon spatial light modulator designed for high yield and low cost manufacturability" OSA TOPS 14 (Spatial Light Modulators), p 102-106 (1997)
8. W. A. Crossland, T. D. Wilkinson. T. M. Coker. A. B. Davey. T. C. B. Yu, "Ferroelectric liquid Crystal on silicon spatial light modulator designed for high yield and low cost fabrication: The Fast Bit Plane SLM". Ferroelectircs 213, p 219-223 (1988).
9. S. Vallmitjana, S. Bosch. I. Juvells, D. Ros, "New multiple matched filter: design and experimental realisation". Appl. Opt. 25, p 4473-4475 (1986)
10. M. A. A. Neil. E. G. S. Paige, "Breaking of inversion symmetry in 2-level, binary. Fourier holograms", Proc. Holographic Systems, Devices and Applications, Neucharel, (1993).
11. G. Y. Yates, R. A. Gallegos, T. E. McDonald, F. J. Zutavern, W. D. Helgesen, G. M. Loubriel, "Range-gated imaging for near-field target identification". Proc. SPIE 2869, p 374-385 (1997)
12. J. L. Bougrenet de a Tocnaye, E. Quemener, Y. Petillot, "Composite versus multichannel binary phase-only filtering". Appl. Opt. 36, p 6646-6653 (1997).

13. B. J. Pernick, "Phase-only and binary phase-only spatial filters for optical correlators: a survey", Opt. & Laser Technol. 23 p 273-282 (1991).

14 W. A. Crossland, M. J. Birch, A B. Davey, and D. G. Vass "Ferroelectirc liquid crystal/silicon VCSI backplane technology for smart spatial light modulators" IEE Colloquium on "Two dimensional optoectronic device arrays" October (1991).

The invention claimed is:

1. An apparatus for detecting the presence of one or more images of a known predetermined kind in a scene, comprising:
    means for producing a scene image corresponding to a scene;
    a digital input means comprising:
        first electronic processing means for processing at least a part of the scene image to produce a scene pattern corresponding to the binarised Fourier Transform of said at least part of the scene image;
        storage means for storing one or more reference patterns, each reference pattern comprising the binarised Fourier Transform of a respective reference image;
        second processing means for electronically combining the scene pattern with a reference pattern to produce a combined pattern; and
    an optical output means for producing an optical output that is derived from the combined pattern wherein the second processing means comprises a logic unit having an exclusive-or function.

2. An apparatus according to claim 1, in which the optical output means comprises a spatial light modulator (SLM) adapted to produce a mask dependent upon the combined pattern, and a light source which is adapted to produce a beam of light that is modulated by the spatial light modulator (SLM).

3. Apparatus according to claim 2, in which the spatial light modulator (SLM) comprises a high speed light modulating ferro-electric liquid crystal material.

4. Apparatus according to claim 3, wherein, after the SLM has been set to display a list of combined patterns (or more than one list), the SLM is driven with an inverse of the integration of the combined patterns of the list displayed so as to reduce the net bias voltage of each pixel to zero.

5. Apparatus according to claim 2, wherein the SLM comprises an array of pixels or elements which can be switched between a first state and a second state, and in which light is modulated differently by pixels that are in the first state in comparison with those that are in the second state.

6. Apparatus according to claim 5, wherein light emerging from pixels in the first and second states have a phase difference of about 180°.

7. Apparatus according to claim 2, wherein the SLM is adapted to digitally process the combined pattern used to drive the SLM with a chirp function to simulate a zone plate lens incorporated with the combined pattern.

8. Apparatus according to claim 2, wherein the SLM comprises a smart spatial light modulator comprising an array of light modulating devices, each device comprising a light detector and at least one pixel of a modulating medium, in which the light detector is adapted to measure the intensity of light incident thereupon to produce a light-level output signal, which output signal is adapted to control the modulating medium so as to either (a) suppress low level light, or (b) moderate high level light.

9. Apparatus according to claim 8, wherein the smart SLM is adapted to threshold light so as to pass substantially only light above a predetermined level, and in which a detector receives light via the smart SLM.

10. Apparatus according to claim 8, wherein a CCD camera (or other pixelated detector) is provided behind the one or more pixels of the smart SLM so that each pixel of the camera is aligned with a corresponding pixel of the smart SLM.

11. An apparatus according to claim 1, further including an optical to electronic conversion means which is adapted to produce an electrical output signal dependent upon the pattern of the modulated optical output.

12. Apparatus according to claim 1, wherein the scene pattern is combined with each reference pattern, or with each reference pattern of a subset of reference patterns.

13. Apparatus according to claim 1, wherein the means adapted to produce the scene image comprises a camera.

14. Apparatus according to claim 13 in which selection means is provided for selecting the whole or a chosen part of the camera output to form the scene images.

15. Apparatus according to claim 1, wherein the optical output means includes an optical to electronic conversion means located in the plane where a correlation peak is formed.

16. Apparatus according to claim 15, wherein the optical to electronic conversion means is adapted to produce an electrical output signal from the optical pattern formed by the modulated light in a focal plane.

17. Apparatus according to claim 1, wherein the optical output means includes a Difference of Gaussian optical spatial filter.

18. Apparatus according to claim 1, wherein said scene imaging means is physically split into at least two portions, the first portion comprising a scene capture device which is connected by optical and/or electrical means to a second portion comprising a base unit which is adapted to perform the Fourier Transforms.

19. Apparatus according to claim 18, wherein the second portion is divided into an optical unit and a digital unit interconnected.

20. An apparatus for detecting the presence of one or more images of a known predetermined kind in a scene, comprising:
    means for producing a scene image corresponding to a scene;
    a digital input means comprising:
        first electronic processing means for processing at least a part of the scene image to produce a scene pattern corresponding to the Fourier Transform of said at least part of the scene image,
        storage means for storing one or more reference patterns, each reference pattern comprising the Fourier Transform of a respective reference image,
        second processing means electronically combining the scene pattern with a reference pattern to produce a combined pattern; and
    an optical output means for producing an optical output that is derived from the combined pattern, wherein the output optical means comprises a spatial light modulator (SLM), at least two light emitting devices, a lens, a light emitting device controller and an output detector array wherein each light emitting device is spaced at a different position relative to the optical axis of the lens and the controller is adapted to illuminate each device sequentially and, wherein the light emitting means, SLM and output detector array are positioned such that the output detector array receives light from the light emitting devices which has been modulated by the SLM.

21. Apparatus according to claim 20 in which the detector array comprises one line of detectors.

22. Apparatus according to claim 20 in which said light emitting devices are arranged as a linear array which is substantially orthogonal to the output detector array.

23. Apparatus according to claim 20 wherein said light emitting devices comprise a VCSEL array.

24. An apparatus aligning an alignable member with a desired scene object comprising:
   means for producing a scene image corresponding to a scene;
   a digital input means comprising:
      a scene imaging device for producing a scene pattern corresponding to the binarised Fourier Transform of said at least part of the scene image,
      storage means for storing one or more reference patterns, each reference pattern comprising a binarised Fourier Transform of a respective reference image,
      a pattern combiner for combining the scene pattern with a reference pattern to produce a binarised combined pattern; and
   an inverse Fourier Transform means acting on the binarised combined pattern for producing a correlation output having at least two correlation peaks, and a controller for controlling the alignment of an alignable member with the scene object so as to bring the correlation peaks towards each other, preferably making them substantially coincident.

25. A method of detecting the presence of one or more reference images in a scene comprising the steps of:
   producing an image scene corresponding to at least part of a scene;
   processing at least a part of the captured image scene to produce a scene pattern corresponding to the binarised Fourier Transform of the captured scene image; and
   electronically combining the scene pattern with at least one reference pattern corresponding to the binarised Fourier Transform of a reference object to produce a binarised combined pattern, the combination being performed by an exclusive- or logic operation and producing an optical output derived by the combined pattern.

26. A method according to claim 25, including the further step of applying a chirp encoded pattern to the signal representative of either (a) the combined pattern passed to the SLM to produce the mask or (b) to the signal representative of the reference pattern, or (c) the scene pattern, or (d) to a combination of (a),(b),or (c) so as to focus different correlation peaks in different planes and monitoring the pattern formed in a plane corresponding to just one of the correlation peaks.

27. A method according to claim 26, wherein the chirp pattern is calculated and added (or applied) to each reference, or scene pattern prior to binarisation.

28. A method according to claim 26, wherein the chirp encoded pattern is calculated as a binary pattern and combined with at least one of (a) a binarised reference pattern; or (b) a binarised scene pattern; or (c) a binarised combined pattern, or (d) a combination of (a) to (c).

29. A method according to claim 26, wherein a different chirp is encoded on each reference pattern within a reference set.

30. An optical pattern recognition and/or location apparatus comprising:
   a combining means for combining a scene pattern representative of the Fourier Transform of a scene image, a reference pattern representative of the Fourier Transform of a reference image and a chirp signal to produce a chirped combined pattern;
   a spatial light modulator (SLM) for displaying the chirped combined pattern;
   a light source for illuminating the SLM;
   a lens acting on light modulated by the SLM; and
   a monitoring means for receiving light modulated by the SLM and for detecting the presence and/or location of the reference images in the scene image.

31. An apparatus as claimed in claim 30 wherein the combining means is adapted to combine a chirp signal with one or both of the reference and scene pattern.

32. An apparatus as claimed in claim 30 wherein the combining means is adapted to combine the scene and reference patterns to form a combined pattern and combine the combined pattern with the chirp signal.

* * * * *